United States Patent
Nakabo

(10) Patent No.: US 10,432,679 B2
(45) Date of Patent: Oct. 1, 2019

(54) METHOD OF COMMUNICATING VIA VIRTUAL SPACE AND SYSTEM FOR EXECUTING THE METHOD

(71) Applicant: COLOPL, Inc., Tokyo (JP)

(72) Inventor: Takashi Nakabo, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/963,940

(22) Filed: Apr. 26, 2018

(65) Prior Publication Data

US 2018/0316734 A1 Nov. 1, 2018

(30) Foreign Application Priority Data

Apr. 26, 2017 (JP) .................................. 2017-087311

(51) Int. Cl.
 *G06T 19/20* (2011.01)
 *G06T 13/40* (2011.01)
 (Continued)

(52) U.S. Cl.
 CPC .......... *H04L 65/4053* (2013.01); *G06T 13/40* (2013.01); *G06T 19/20* (2013.01);
 (Continued)

(58) Field of Classification Search
 CPC .................................................... G06T 13/40
 See application file for complete search history.

(56) References Cited

U.S. PATENT DOCUMENTS

| 6,728,784 B1 * | 4/2004 | Mattaway | H04L 12/1822 370/260 |
| 2009/0153474 A1 * | 6/2009 | Quennesson | G06F 3/012 345/157 |

(Continued)

FOREIGN PATENT DOCUMENTS

| JP | 2011-175439 A | 9/2011 |
| JP | 2016-187432 A | 11/2016 |

(Continued)

OTHER PUBLICATIONS

Notice of Allowance in JP Application No. 2017-087311, dated Sep. 26, 2017, 6pp.

*Primary Examiner* — Phi Hoang
(74) *Attorney, Agent, or Firm* — Hauptman Ham, LLP

(57) ABSTRACT

A method to be executed by a first computer includes receiving at every first time interval a first signal output by a first sensor. The method further includes generating first data in accordance with the first signal. The method further includes receiving at every second time interval, which is shorter than the first time interval, a second signal output by a second sensor. The method further includes generating second data in accordance with the second signal. The method further includes generating a plurality of pieces of animation data including the first data and the second data. The method further includes transmitting the plurality of pieces of animation data to a second computer configured to communicate to/from the first computer. A total number of pieces of second data included in the plurality of pieces of animation data is smaller than a total number of pieces of second data generated by the first computer.

13 Claims, 37 Drawing Sheets

(51) Int. Cl.
*H04L 29/06* (2006.01)
*H04N 7/15* (2006.01)
*H04N 7/14* (2006.01)

(52) U.S. Cl.
CPC ............ *H04L 65/403* (2013.01); *H04L 67/38* (2013.01); *H04N 7/142* (2013.01); *H04N 7/157* (2013.01)

(56) References Cited

U.S. PATENT DOCUMENTS

| | | | | |
|---|---|---|---|---|
| 2010/0287473 | A1* | 11/2010 | Recesso | G09B 5/00 |
| | | | | 715/716 |
| 2011/0119332 | A1* | 5/2011 | Marshall | A63F 13/10 |
| | | | | 709/203 |
| 2011/0205243 | A1 | 8/2011 | Matsuda | |
| 2014/0092130 | A1* | 4/2014 | Anderson | G06F 3/011 |
| | | | | 345/632 |
| 2015/0134495 | A1* | 5/2015 | Naware | G06T 19/20 |
| | | | | 705/27.2 |
| 2015/0261291 | A1* | 9/2015 | Mikhailov | G06F 3/012 |
| | | | | 345/156 |
| 2016/0300387 | A1* | 10/2016 | Ziman | G06T 19/003 |
| 2017/0352183 | A1* | 12/2017 | Katz | G06T 19/006 |
| 2018/0095529 | A1* | 4/2018 | Tokubo | G06F 3/012 |
| 2018/0272231 | A1* | 9/2018 | Katoh | G01B 11/26 |

FOREIGN PATENT DOCUMENTS

| | | |
|---|---|---|
| JP | 6027585 B2 | 11/2016 |
| JP | 2017-102897 A | 6/2017 |

\* cited by examiner

FIG. 18A  1810

| USER ID | x-COORDINATE VALUE | y-COORDINATE VALUE | ELAPSED TIME | DATA ID |
|---|---|---|---|---|
| 190 | 100.00 | 123.00 | 0.01 | 001 |
| 190 | 101.00 | 123.00 | 0.02 | 002 |
| 190 | 102.00 | 122.00 | 0.03 | 003 |
| ... | ... | ... | ... | ... |

FIG. 18B  1820

| USER ID | SOUND DATA | ELAPSED TIME | DATA ID |
|---|---|---|---|
| 190 | ... | 0.01 | 001 |
| 190 | ... | 0.02 | 002 |
| 190 | ... | 0.03 | 003 |
| ... | ... | ... | ... |

FIG. 18C  1830

| USER ID | x-COORDINATE VALUE | y-COORDINATE VALUE | ELAPSED TIME | DATA ID |
|---|---|---|---|---|
| 190N | 90.00 | 111.00 | 0.01 | 001 |
| 190N | 91.00 | 112.00 | 0.02 | 002 |
| 190N | 92.00 | 113.00 | 0.03 | 003 |
| ... | ... | ... | ... | ... |

FIG. 18D  1840

| USER ID | SOUND DATA | ELAPSED TIME | DATA ID |
|---|---|---|---|
| 190N | ... | 0.01 | 001 |
| 190N | ... | 0.02 | 002 |
| 190N | ... | 0.03 | 003 |
| ... | ... | ... | ... |

| POINT | u | v | w |
|---|---|---|---|
| a | ua | va | wa |
| b | ub | vb | wb |
| ⋮ | ⋮ | ⋮ | ⋮ |
| x | ux | vx | wx |

FIG. 30A

| USER ID | DETECTION RESULT | TIME INFORMATION | DATA ID |
|---|---|---|---|
| 190 | FACE TRACKING DATA F1 | 20170505141320500 | 001 |
| 190 | FACE TRACKING DATA F2 | 20170505141320516 | 002 |
| 190 | FACE TRACKING DATA F3 | 20170505141320533 | 003 |
| ⋮ | ⋮ | ⋮ | ⋮ |

FIG. 30B

| USER ID | DETECTION RESULT | TIME INFORMATION | DATA ID |
|---|---|---|---|
| 190 | EYE TRACKING DATA E1 | 20170505141320500 | 001 |
| 190 | EYE TRACKING DATA E2 | 20170505141320508 | Null |
| 190 | EYE TRACKING DATA E3 | 20170505141320517 | 002 |
| 190 | EYE TRACKING DATA E4 | 20170505141320525 | Null |
| ⋮ | ⋮ | ⋮ | ⋮ |

FIG. 30C

| USER ID | SOUND SIGNAL | TIME INFORMATION | DATA ID |
|---|---|---|---|
| 190 | SOUND SIGNAL S1 | 20170505141320500 | 001 |
| 190 | SOUND SIGNAL S2 | 20170505141320516 | 002 |
| 190 | SOUND SIGNAL S3 | 20170505141320533 | 003 |
| ⋮ | ⋮ | ⋮ | ⋮ |

| FACE TRACKING DATA F11 |
| FACE TRACKING DATA F12 |
| FACE TRACKING DATA F13 |
| FACE TRACKING DATA F4 |
| FACE TRACKING DATA F5 |
| FACE TRACKING DATA F6 |
| FACE TRACKING DATA F7 |
| FACE TRACKING DATA F8 |
| FACE TRACKING DATA F9 |
| FACE TRACKING DATA F10 |

| EYE TRACKING DATA E11 |
| EYE TRACKING DATA E12 |
| EYE TRACKING DATA E13 |
| EYE TRACKING DATA E14 |
| EYE TRACKING DATA E15 |
| EYE TRACKING DATA E16 |
| EYE TRACKING DATA E7 |
| EYE TRACKING DATA E8 |
| EYE TRACKING DATA E9 |
| EYE TRACKING DATA E10 |

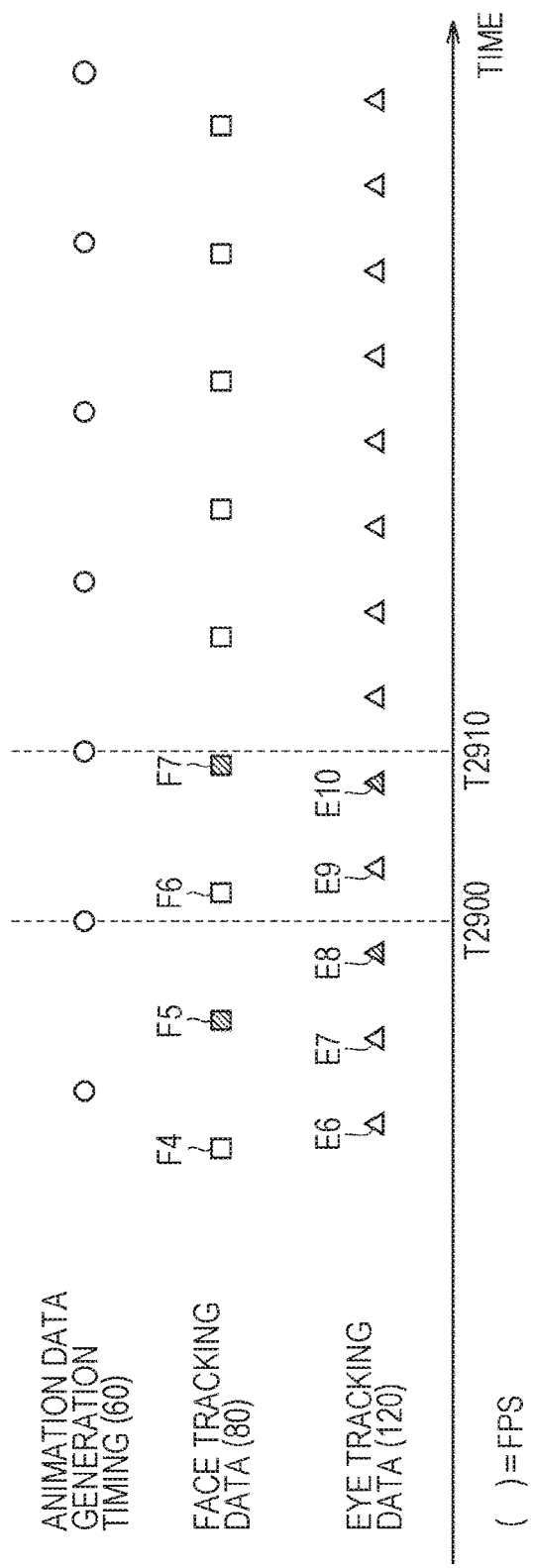

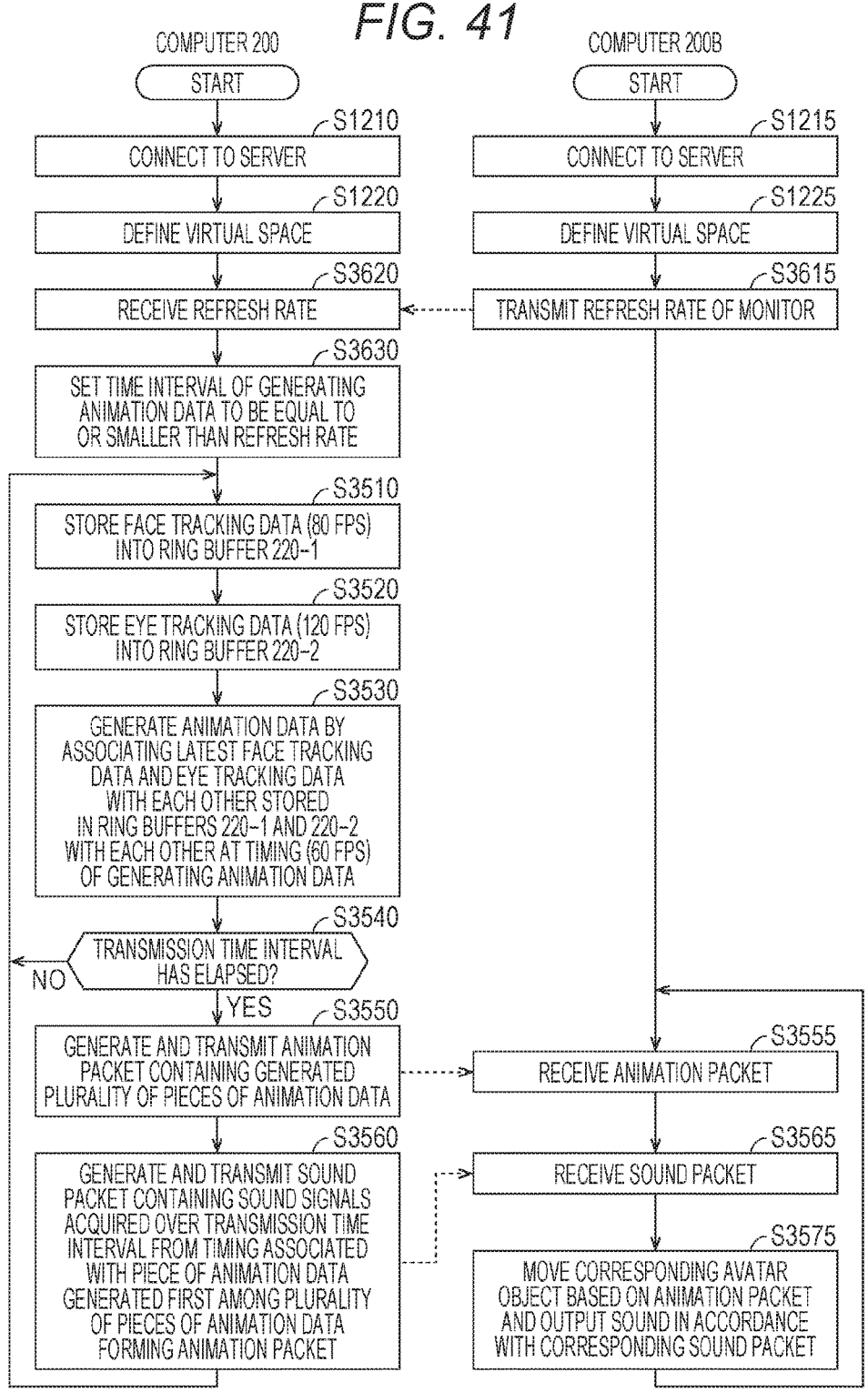

METHOD OF COMMUNICATING VIA VIRTUAL SPACE AND SYSTEM FOR EXECUTING THE METHOD

RELATED APPLICATIONS

The present application claims priority to Japanese Application No. 2017-087311, filed on Apr. 26, 2017, the disclosure of which is hereby incorporated by reference herein in its entirety.

TECHNICAL FIELD

This disclosure relates to control of communication, and more particularly, to control of communication via a virtual reality space.

BACKGROUND

There is a technology of performing communication via a virtual reality space (hereinafter also referred to as "virtual space"). For example, in Japanese Patent Application Laid-open No. 2016-187432 (Patent Document 1), there is described "a game program and a game system, which are capable of causing operational capabilities of participating users to be substantially the same in a game configured so that those users act in the same phase of a virtual space". In Japanese Patent No. 6027585 (Patent Document 2), there is described "a technology capable of displaying a high-definition video on a display formed of a plurality of displays without imposing an excessive load on a computer".

PATENT DOCUMENTS

[Patent Document 1] JP 2016-187432 A
[Patent Document 2] JP 6027585 B

SUMMARY

According to at least one embodiment, there is provided a method to be executed by a computer. The method includes receiving at every first time interval a first signal output by a first sensor. The method further includes generating first data in accordance with the first signal. The method further includes receiving at every second time interval, which is shorter than the first time interval, a second signal output by a second sensor. The method further includes generating second data in accordance with the second signal; generating a plurality of pieces of animation data including the first data and the second data. The method further includes transmitting the plurality of pieces of animation data to a second computer configured to communicate to/from the first computer, wherein a total number of pieces of second data included in the plurality of pieces of animation data is smaller than a total number of pieces of second data generated by the first computer.

The above-mentioned and other objects, features, aspects, and advantages of the disclosure may be made clear from the following detailed description of this disclosure, which is to be understood in association with the attached drawings.

BRIEF DESCRIPTION OF THE DRAWINGS

FIG. 18A A table of eye tracking data acquired by the HMD used by the user according to at least one embodiment of this disclosure.

FIG. 18B A table of sound data that is based on an utterance of the user according to at least one embodiment of this disclosure.

FIG. 18C A table of eye tracking data acquired by the HMD used by a user according to at least one embodiment of this disclosure.

FIG. 18D A table of sound data that is based on an utterance of the user according to at least one embodiment of this disclosure.

FIG. 30A A table of an example of a data structure of face data according to at least one embodiment of this disclosure.

FIG. 30B A table of an example of a data structure of eye data according to at least one embodiment of this disclosure.

FIG. 30C A table of an example of a data structure of a sound packet according to at least one embodiment of this disclosure.

FIG. 32 A diagram of an example of a data structure of a ring buffer according to at least one embodiment of this disclosure.

FIG. 33 A diagram of an example of a data structure of a ring buffer according to at least one embodiment of this disclosure.

FIG. 34 A diagram of an example of processing of generating animation data according to at least one embodiment of this disclosure.

FIG. 41 A flowchart of an example of synchronization processing between a sound and a video in which consideration is given to a refresh rate of a chat destination according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
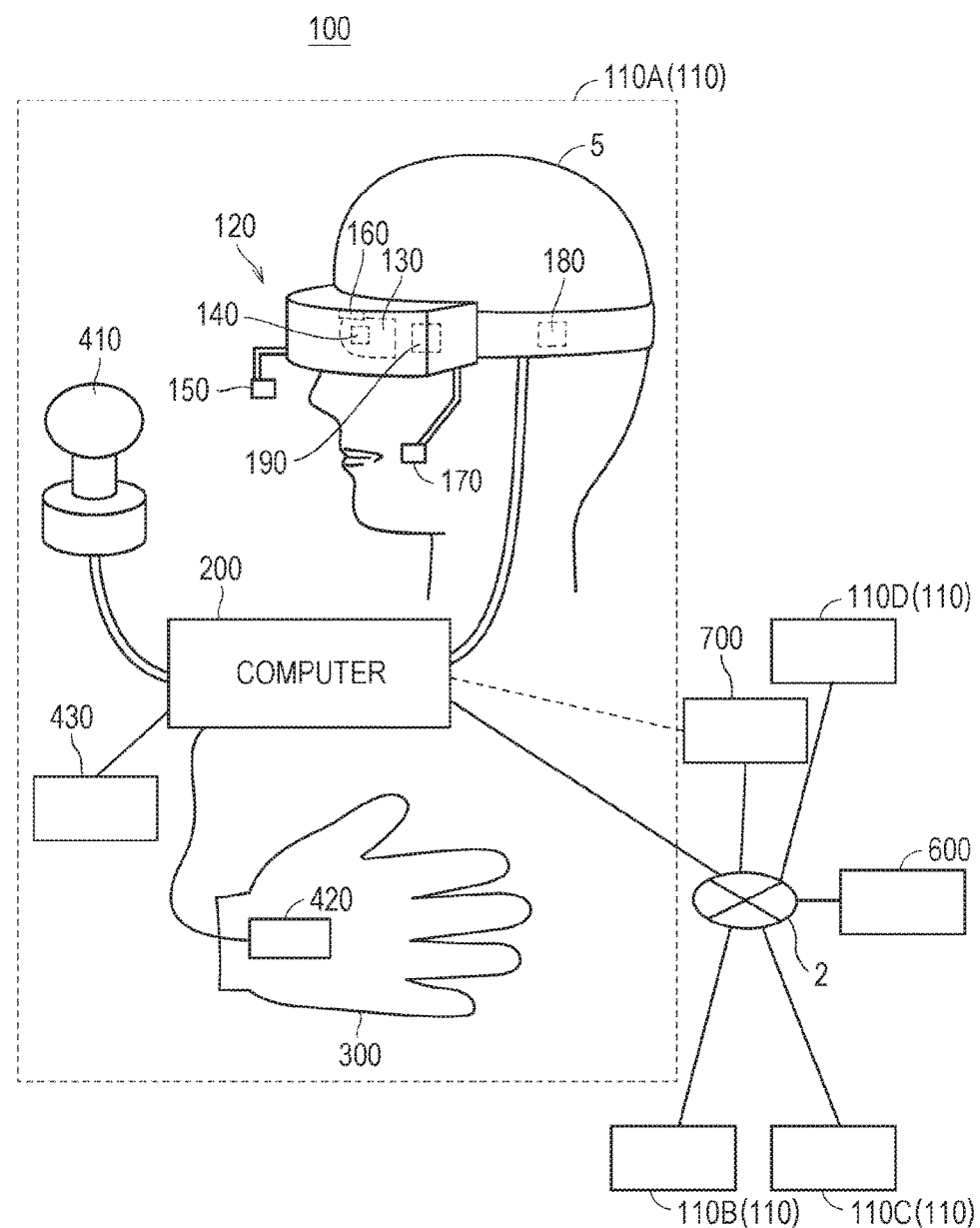
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least anyone of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer 200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
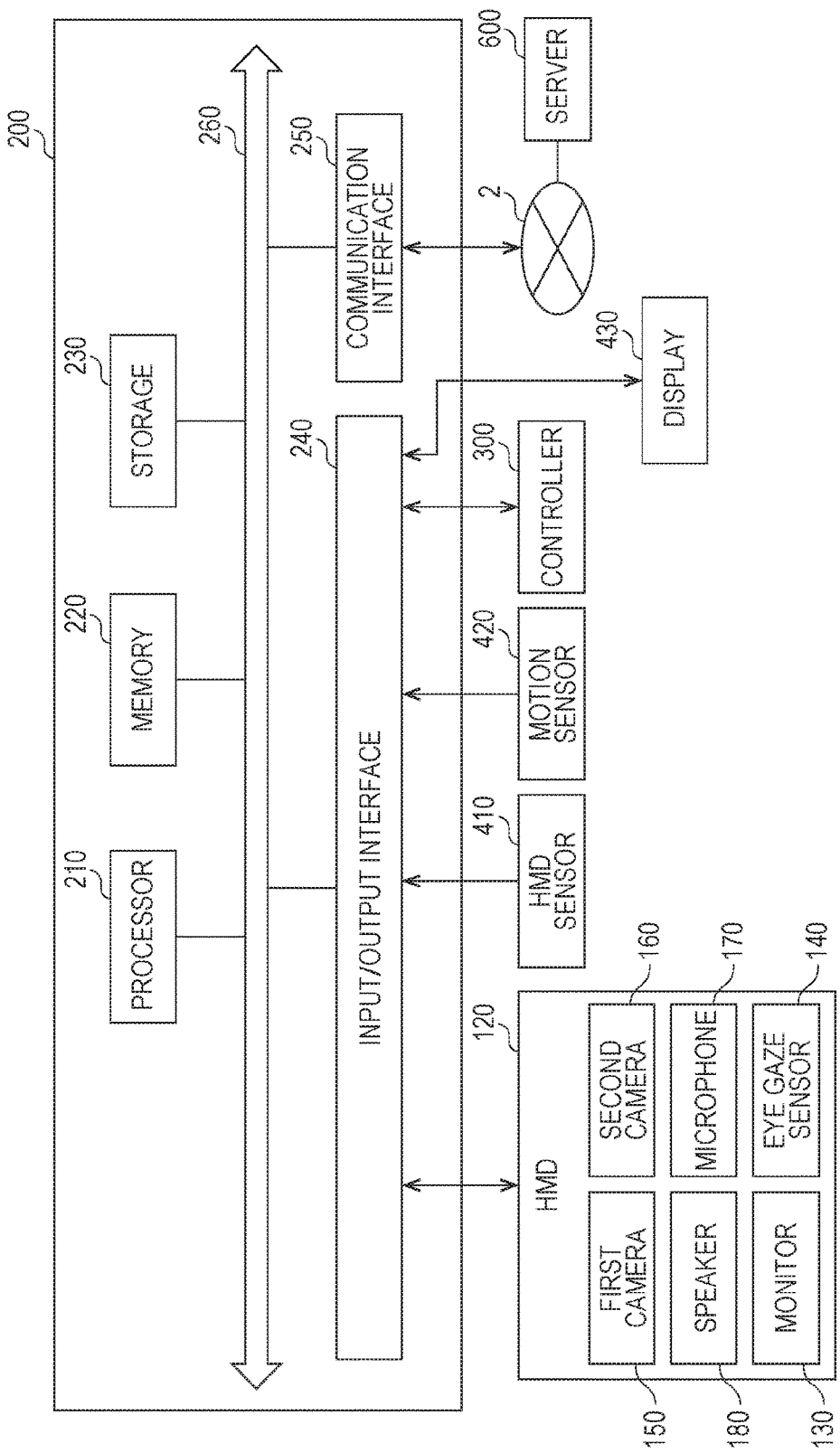
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
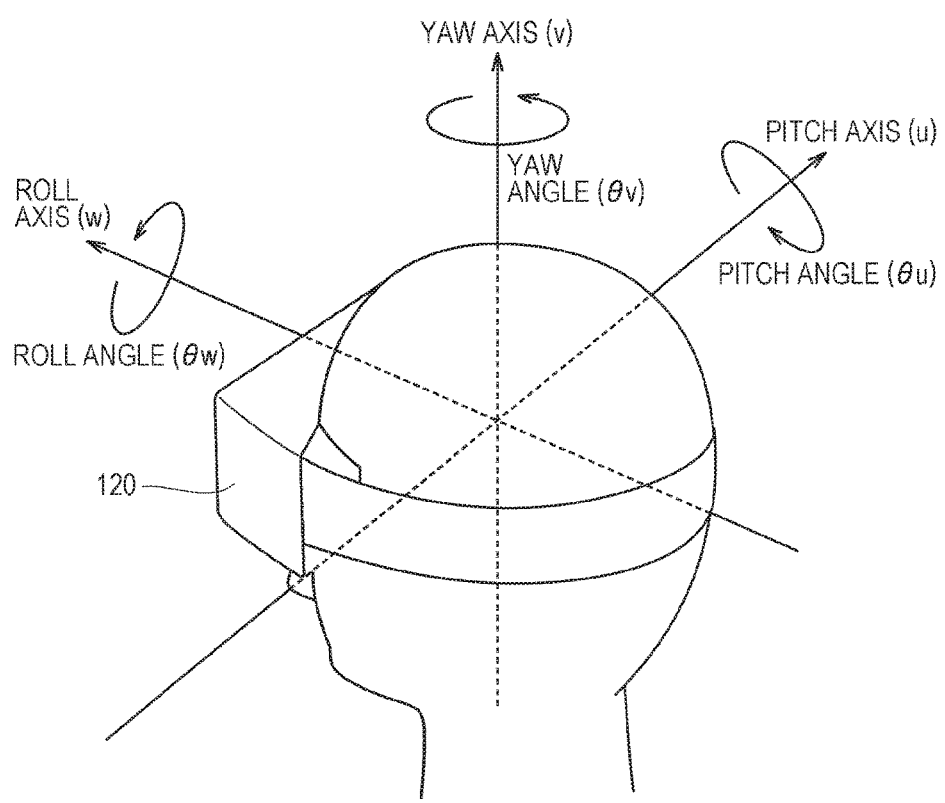
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($\theta u$), a yaw angle ($\theta v$), and a roll angle ($\theta w$) of the HMD 120 in the uvw visual-field coordinate system. The pitch angle ($\theta u$) represents an inclination angle of the HMD 120 about the pitch axis in the uvw visual-field coordinate system. The yaw angle ($\theta v$) represents an inclination angle of the HMD 120 about the yaw axis in the uvw visual-field coordinate system. The roll angle ($\theta w$) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
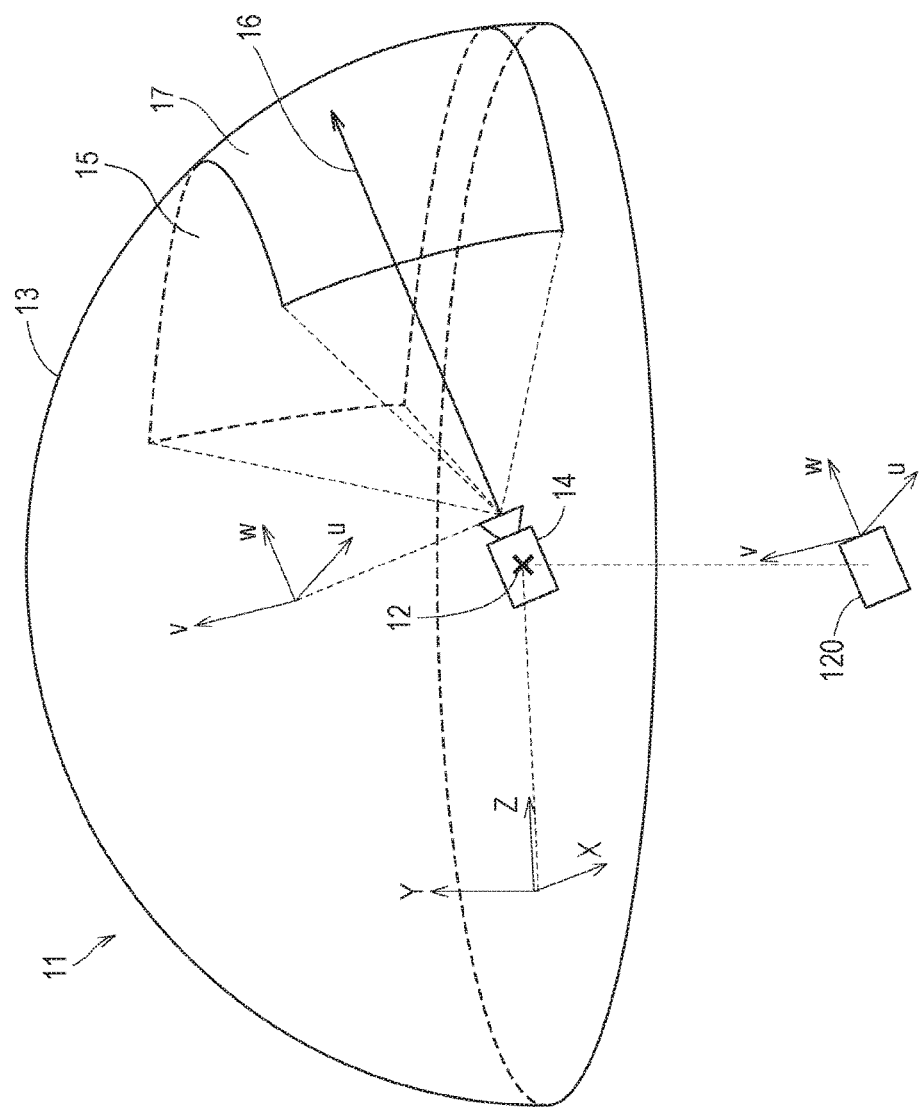
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
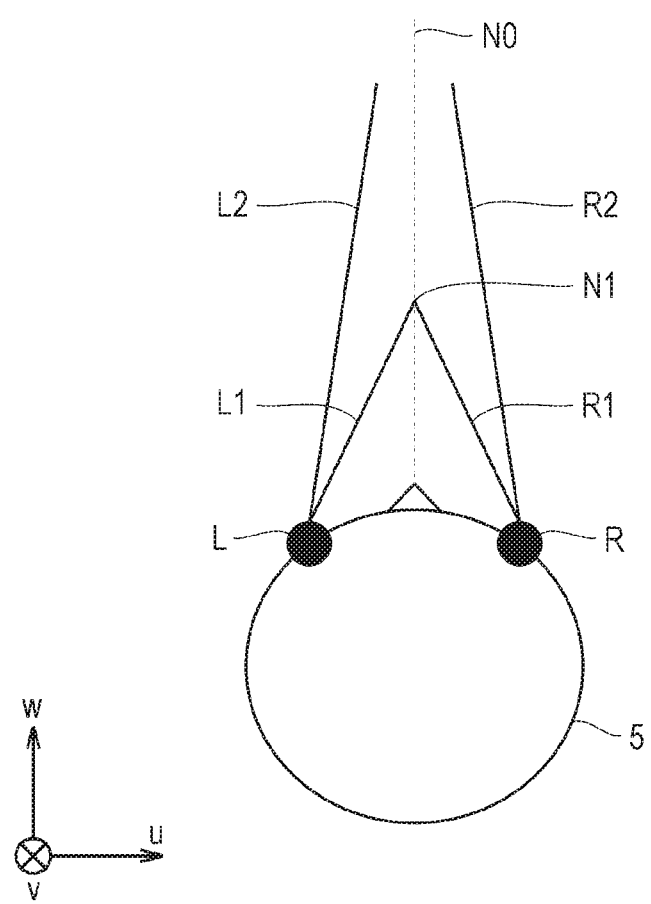
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
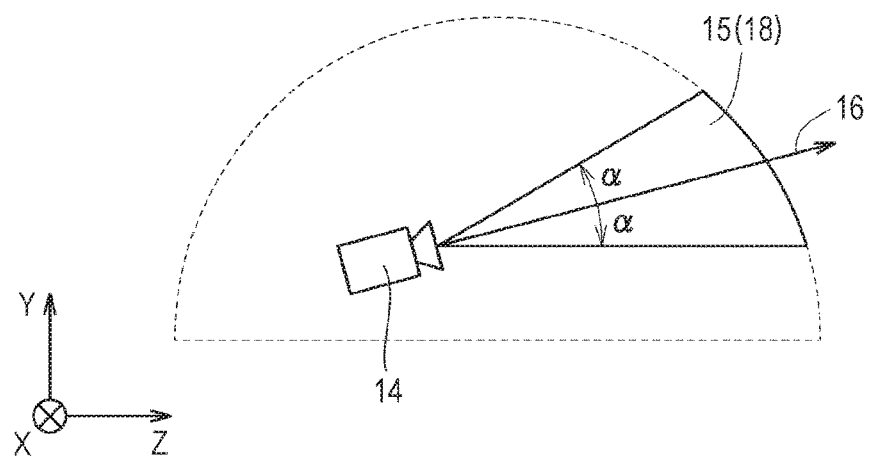
FIG. 6 A diagram of a YZ cross section obtained by viewing a field-of-view region from an X direction in the virtual space according to at least one embodiment of this disclosure.
Figure 7:
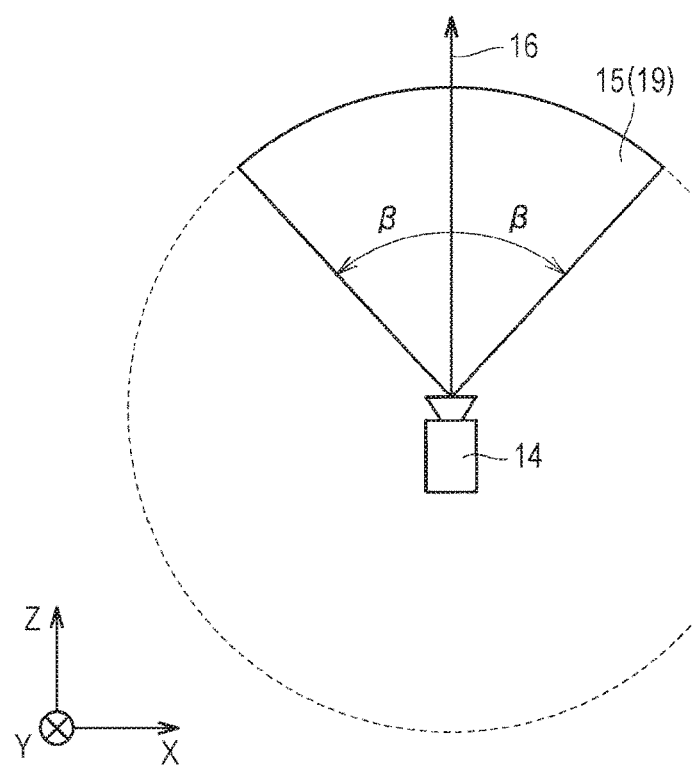
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
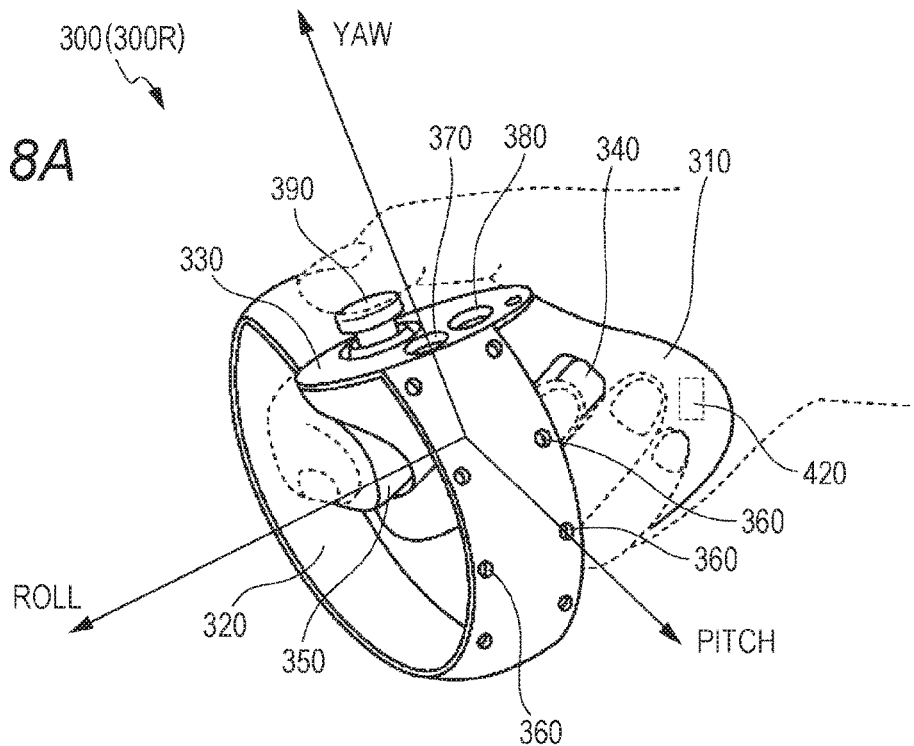
FIG. 8A A diagram of a schematic configuration of a controller according to at least one embodiment of this disclosure.
Figure 8B:
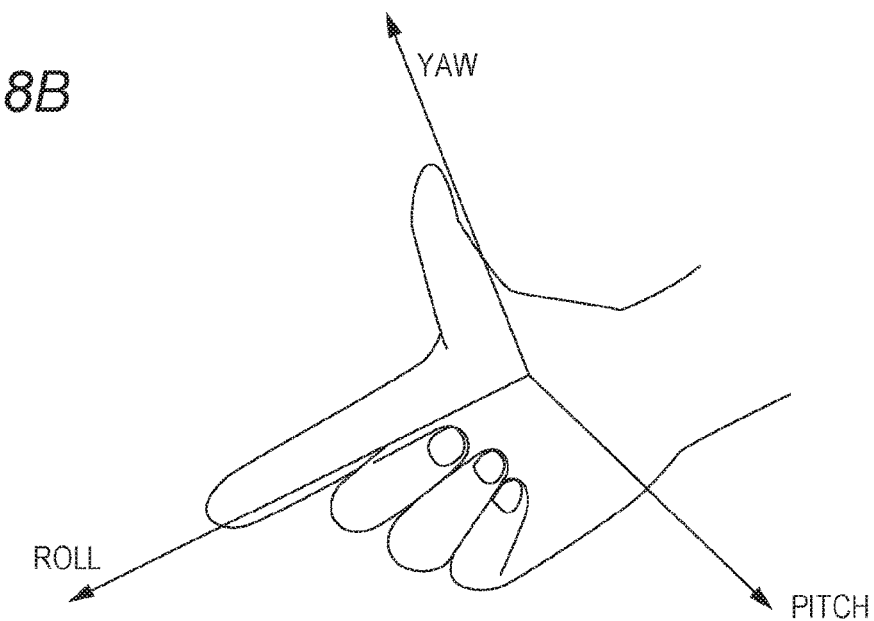
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

Figure 9:
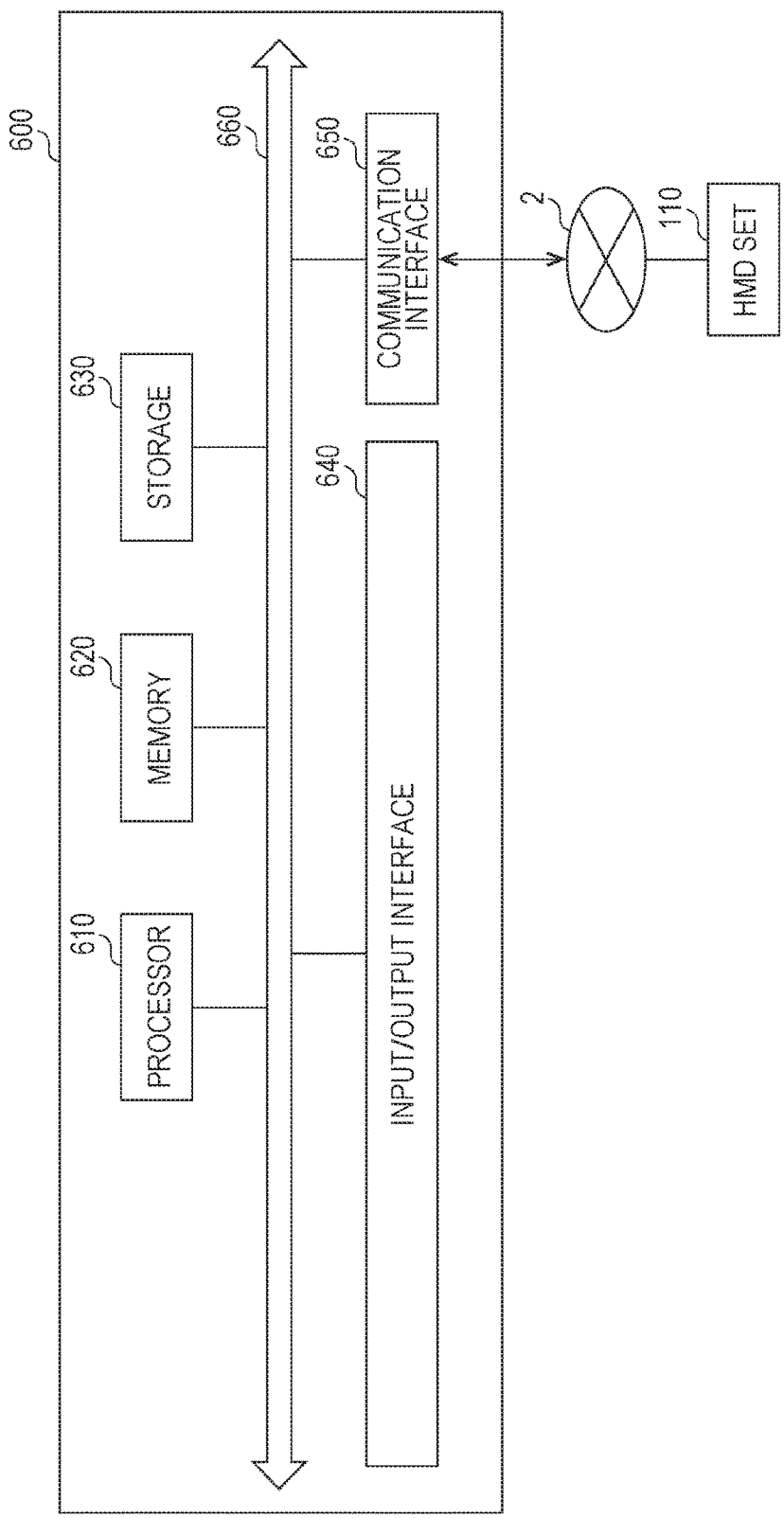
FIG. 9 A block diagram of a hardware configuration of a server according to at least one embodiment of this disclosure.

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
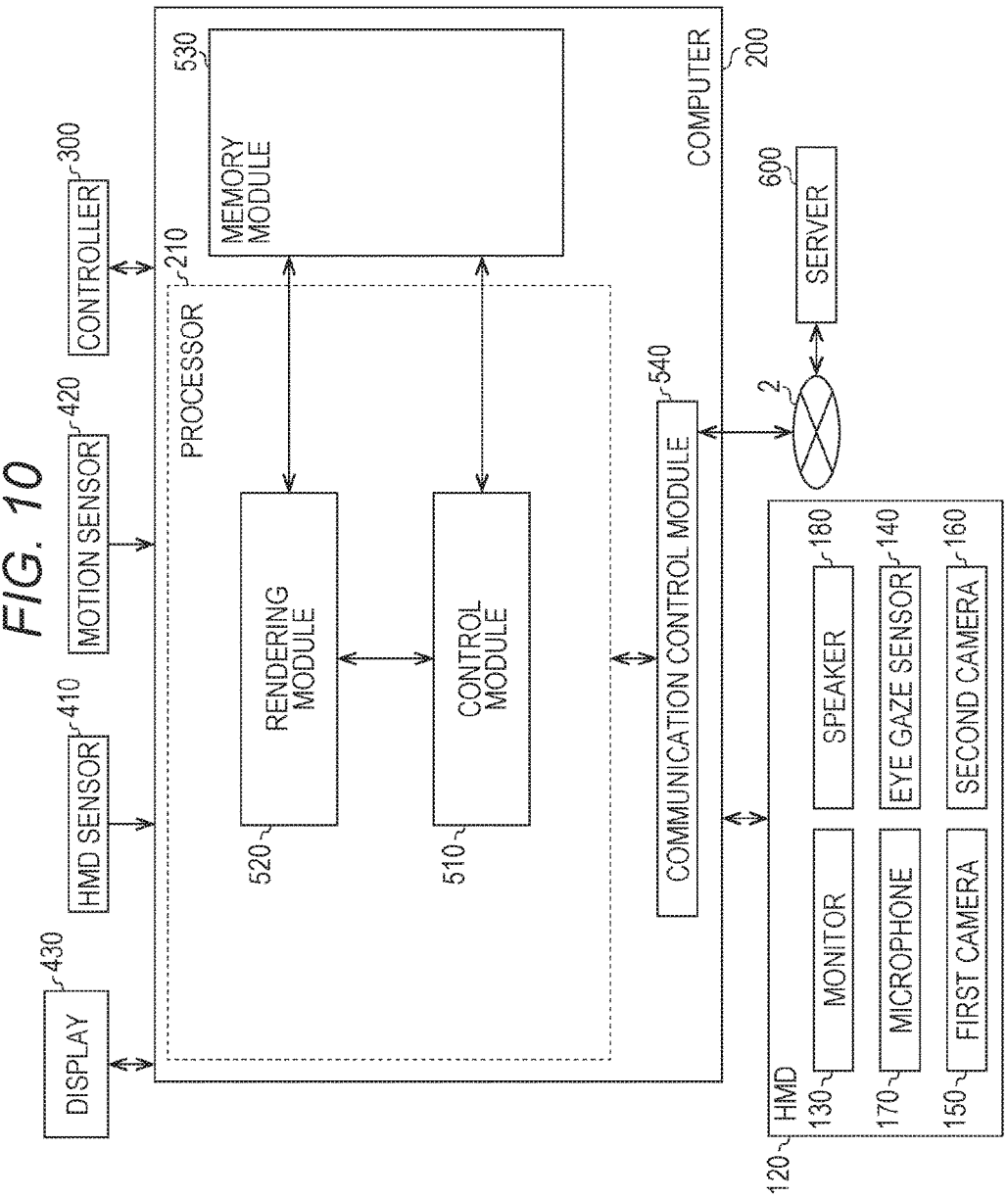
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

Figure 11:
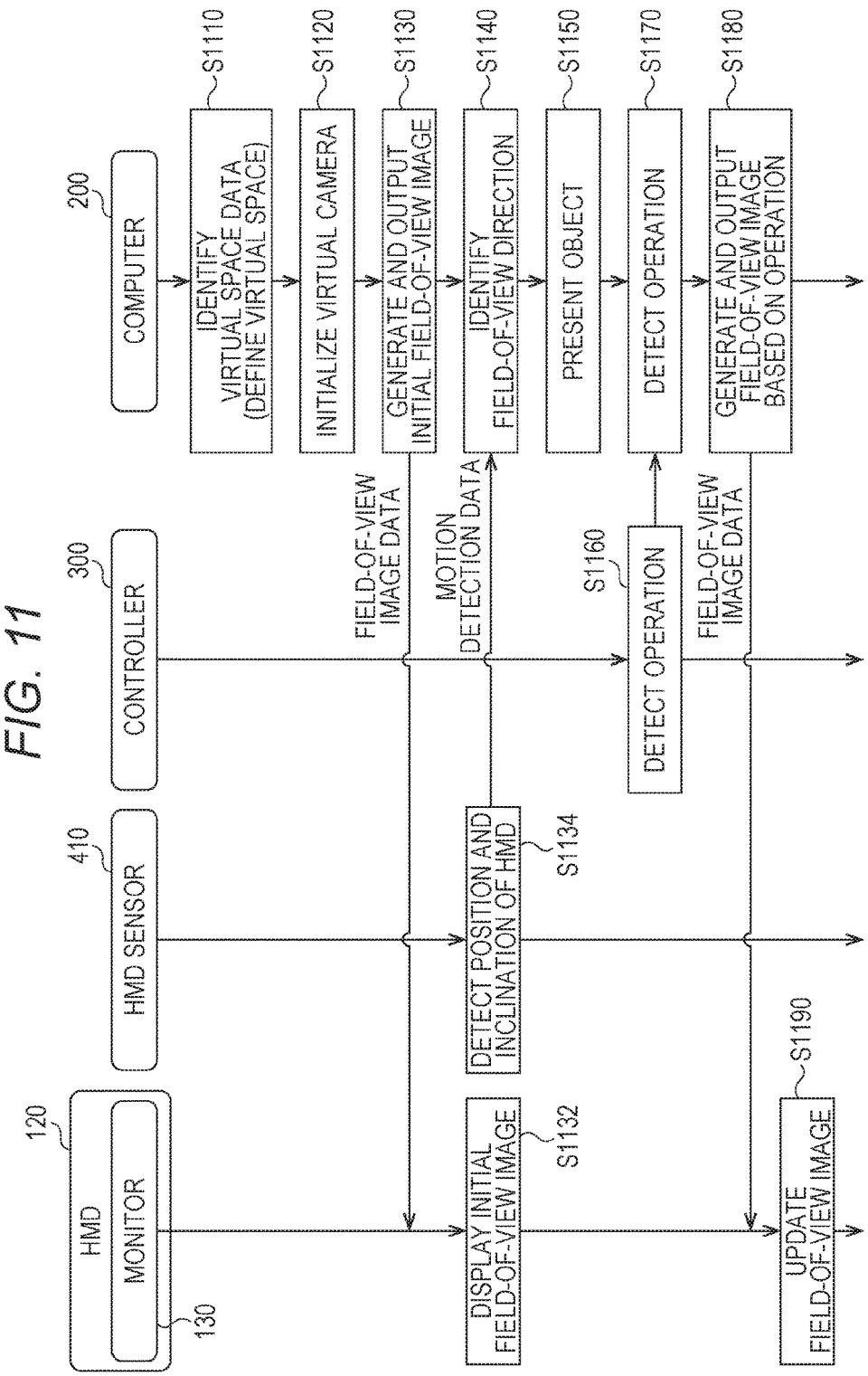
FIG. 11 A sequence chart of processing to be executed by a system including an HMD set according to at least one embodiment of this disclosure.

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
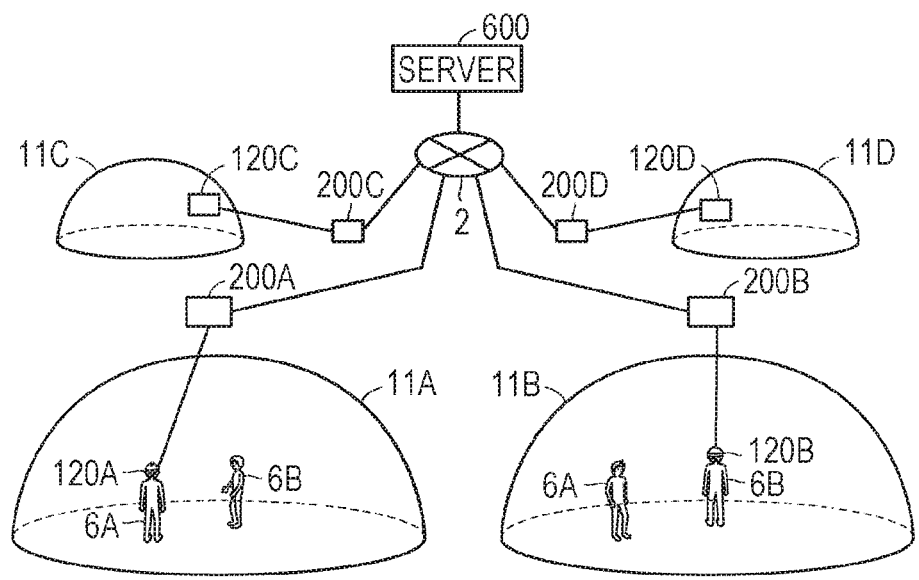
FIG. 12A A schematic diagram of HMD systems of several users sharing the virtual space interact using a network according to at least one embodiment of this disclosure.
Figure 12B:
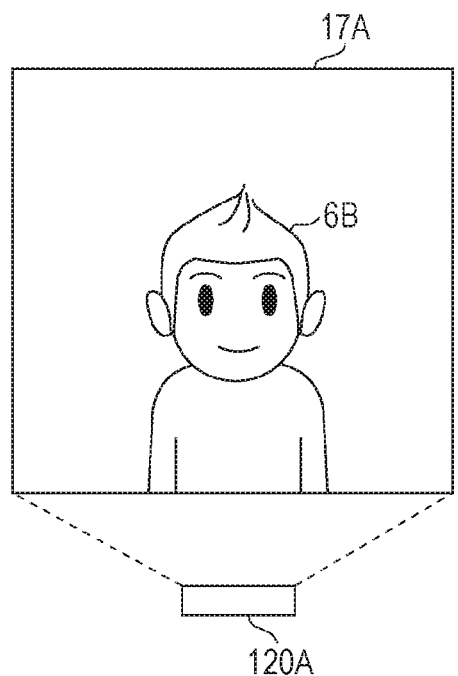
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

Figure 13:
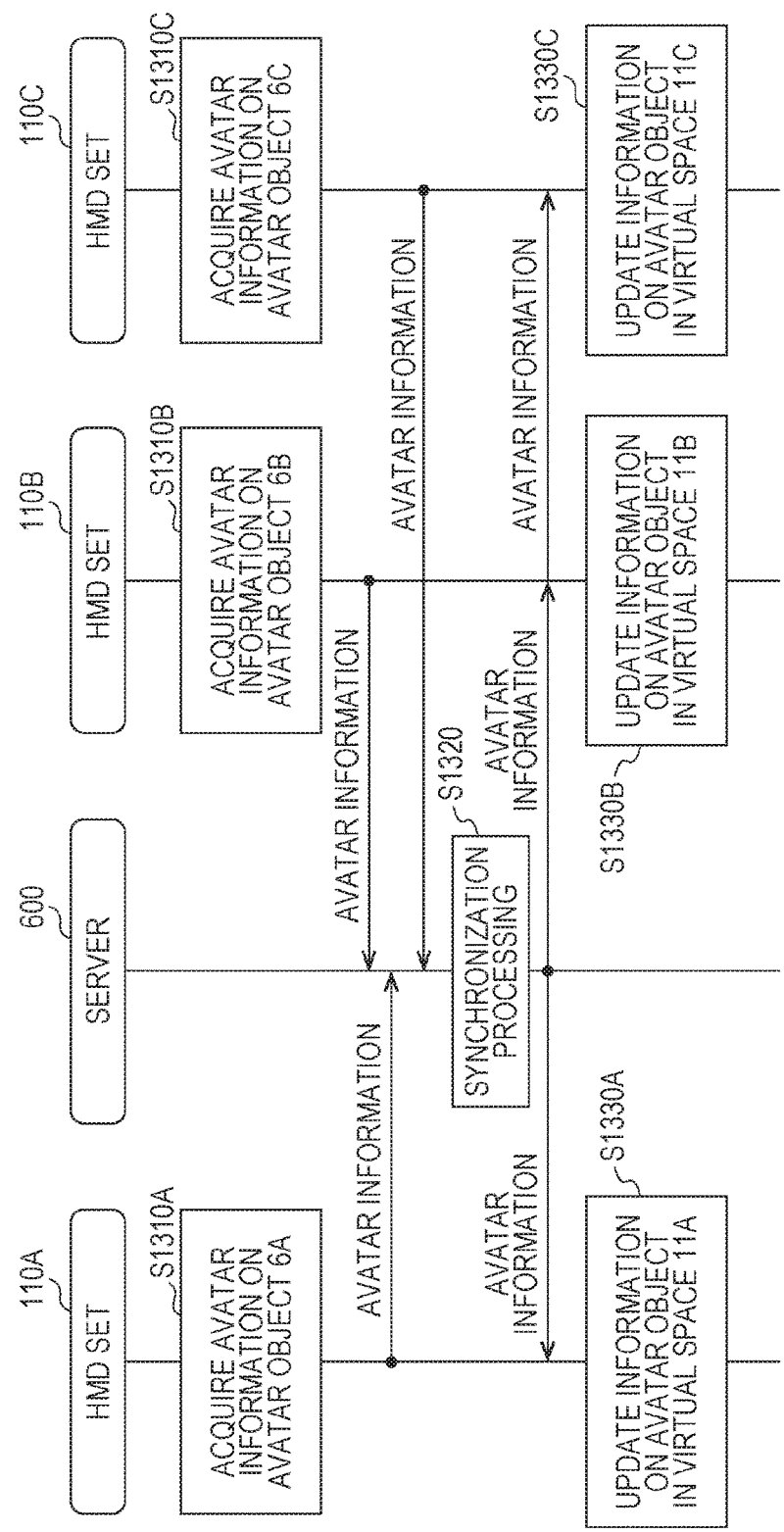
FIG. 13 A sequence diagram of processing to be executed by a system including an HMD interacting in a network according to at least one embodiment of this disclosure.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Detailed Configuration of Modules]

Figure 14:
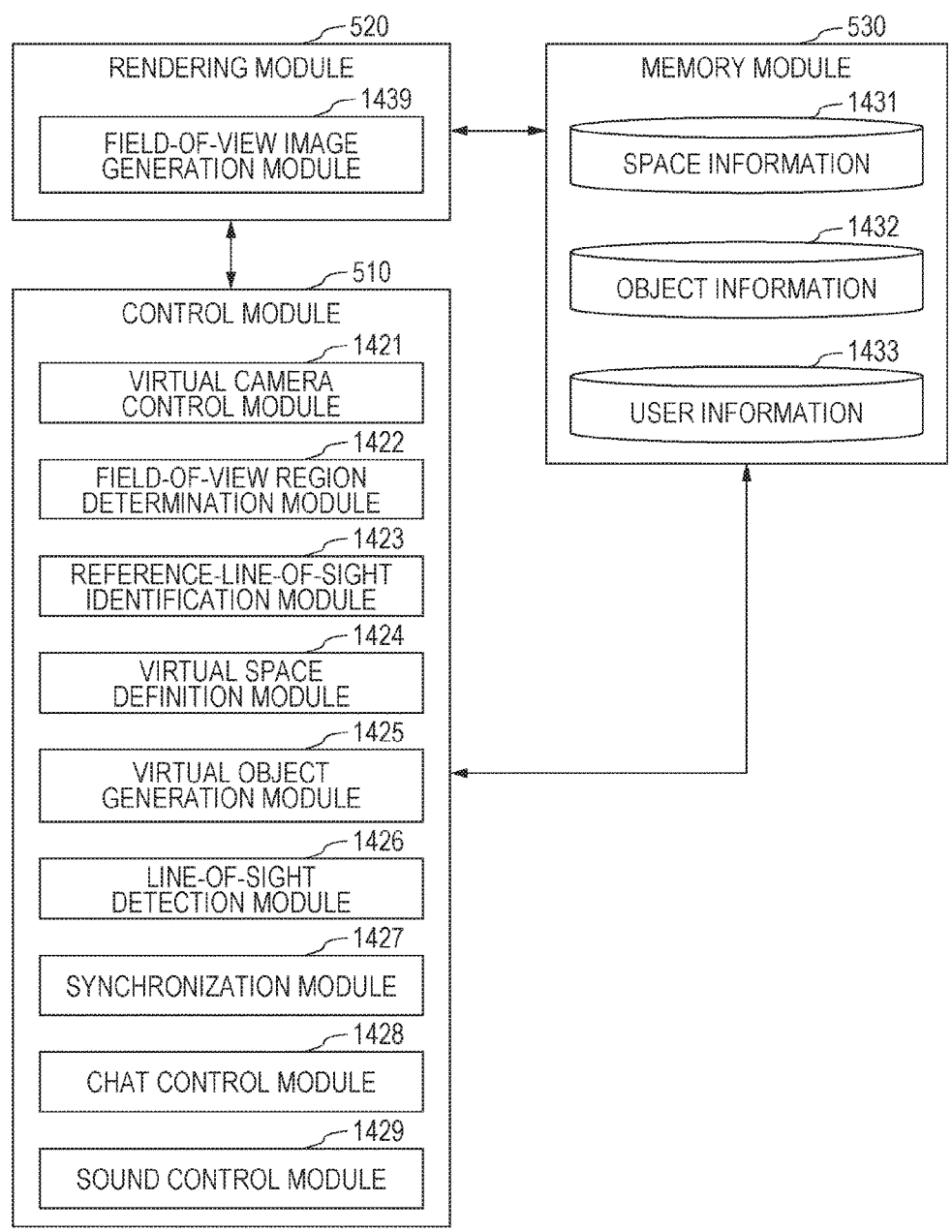
FIG. 14 A block diagram of a configuration of a computer according to at least one embodiment of this disclosure.

With reference to FIG. 14, a module configuration of the computer 200 is described. FIG. 14 is a block diagram of a configuration of modules of the computer according to at least one embodiment of this disclosure.

In FIG. 14, the control module 510 includes a virtual camera control module 1421, a field-of-view region determination module 1422, a reference-line-of-sight identification module 1423, a virtual space definition module 1424, a virtual object generation module 1425, a line-of-sight detection module 1426, a synchronization module 1427, a chat control module 1428, and a sound control module 1429. The rendering module 520 includes a field-of-view image generation module 1439. The memory module 530 stores space information 1431, object information 1432, and user information 1433. In the following, the reference symbol "A" of each component relating to the HMD set 110A may be omitted from the description.

In at least one aspect, the control module 510 controls display of an image on the monitor 130 of the HMD 120. The virtual camera control module 1421 arranges the virtual camera 14 in the virtual space 11, and controls, for example, the behavior and direction of the virtual camera 14. The field-of-view region determination module 1422 defines the field-of-view region 15 in accordance with the direction of the head of the user 5 wearing the HMD 120. The field-of-view image generation module 1439 generates a field-of-view image to be displayed on the monitor 130 based on the determined field-of-view region 15. Further, the field-of-view image generation module 1439 generates a field-of-view image based on data received from the control module 510. Data on the field-of-view image generated by the field-of-view image generation module 1439 is output to the HMD 120 by the communication control module 540. The reference-line-of-sight identification module 1423 identifies the line of sight of the user 5 based on the signal from the eye gaze sensor 140.

The sound control module 1429 detects, from the HMD 120, input of a sound signal that is based on an utterance of the user 5 into the computer 200. The sound control module 1429 assigns the sound signal corresponding to the utterance with an input time of the utterance to generate sound data. The sound control module 1429 transmits the sound data to a computer used by a user who is selected by the user 5 among the other computers 200B and 200C in the state of being capable of communicating to/from the computer 200 as chat partners of the user 5.

The control module 510 controls the virtual space 11 to be provided to the user 5. First, the virtual space definition module 1424 generates virtual space data representing the virtual space 11, to thereby define the virtual space 11 in the HMD system 100.

The virtual object generation module 1425 generates data on objects to be arranged in the virtual space 11. For example, the virtual object generation module 1425 generates data on avatar objects representing the respective other users 5B and 5C, who are to chat with the user 5 via the virtual space 11. Further, the virtual object generation module 1425 may change the line of sight of the avatar object of the user based on the lines of sights detected in response to utterances of the other users 5B and 5C.

The line-of-sight detection module 1426 detects the line of sight of the user 5 based on output from the eye gaze sensor 140. In at least one aspect, the line-of-sight detection module 1426 detects the line of sight of the user 5 at the time of the utterance of the user 5 when such an utterance is detected. Detection of the line of sight is implemented by a known technology, for example, non-contact eye tracking. As an example, as in the case of the limbus tracking method, the eye gaze sensor 140 may detect a motion of the line of sight of the user 5 based on data obtained by radiating an infrared ray to eyes of the user 5 and photographing the reflected light with a camera (now shown). In at least one aspect, the line-of-sight detection module 1426 identifies each position that depends on a motion of the line of sight of the user 5 as coordinate values (x, y) with a certain position on a display region of the monitor 130 serving as a reference point.

The synchronization module 1427 implements synchronization of sound and video when communication is performed via the virtual space 11. For example, in at least one embodiment of this disclosure, when data (eye tracking data) representing a line-of-sight detection result and sound data that are acquired at the same timing by another computer 200B reach the computer 200 at different timings, the synchronization module 1427 synchronizes the timing of outputting sound and the timing of outputting data of the avatar object so that a change (e.g., movement of line of sight and change of posture) of the avatar object and output of sound are performed at the same timing.

For example, in at least one aspect, sound data transmitted by another computer 200B (namely, same chat partner) arrives at the computer 200 before arrival of eye tracking data transmitted by that computer 200B. In this case, the synchronization module 1427 temporarily stores the sound data into a work area of the memory module 530, and waits to output sound until receiving eye tracking data.

In contrast, the eye tracking data transmitted by the computer 200B may arrive at the computer 200 before arrival of the sound data. In this case, the synchronization module 1427 generates image data for presenting an avatar object whose line of sight has been changed based on the eye tracking data, temporarily stores the image data into a work area of the memory module 530, and waits to output the image data until receiving sound data. When the synchronization module 1427 detects reception of sound data, the synchronization module 1427 reads the image data from the memory module 530 for output to the HMD 120, and also outputs the sound data to the speaker 180 via the sound control module 1429.

The chat control module 1428 controls communication via the virtual space. In at least one aspect, the chat control module 1428 reads a chat application from the memory module 530 based on an operation by the user 5 or a request for starting a chat transmitted by another computer 200B, to thereby start communication via the virtual space 11. When the user 5 inputs a user ID and a password into the computer 200 to perform a login operation, the user 5 is associated with a session (also referred to as "room") of a chat as one member of the chat via the virtual space 11. After that, when the user 5B using the computer 200B logs in to the chat of the session, the user 5 and the user 5B are associated with each other as members of the chat. When the chat control module 1428 identifies a user 5B of the computer 200B, who is to be a communication partner of the computer 200, the virtual object generation module 1425 uses the object information 1432 to generate data for presenting an avatar object corresponding to the user 5B, and outputs the data to the HMD 120. When the HMD 120 displays the avatar object corresponding to the user 5B on the monitor 130 based on the data, the user 5 wearing the HMD 120 recognizes the avatar object in the virtual space 11.

In at least one embodiment of this disclosure, the chat control module 1428 waits for input of sound data that is based on an utterance of the user 5 and input of data from the eye gaze sensor 140. When the user 5 performs an operation (e.g., operation of controller, gesture, selection by voice, or gaze by line of sight) for selecting an avatar object in the virtual space 11, the chat control module 1428, based on the operation, detects the fact that the user (e.g., user 5) corresponding to the avatar object is selected as the chat partner. When the chat control module 1428 detects an utterance of the user 5, the chat control module 1428 transmits sound data that is based on a signal transmitted by the microphone 170 and eye tracking data that is based on a signal transmitted by the eye gaze sensor 140 to the computer 200B via the communication control module 540 based on a network address of the computer 200B used by the user 5B. The computer 200B updates the line of sight of the avatar object of the user 5 based on the eye tracking data, and transmits the sound data to the HMD 120B. When the computer 200B has a synchronization function, the line of sight of the avatar object is changed on the monitor 130 and sound is output from the speaker 180 substantially at the same timing, and thus the user 5B is less likely to feel strange.

The space information 1431 stores one or more templates that are defined to provide the virtual space 11.

The object information 1432 stores data for displaying an avatar object to be used for communication via the virtual space 11, content to be reproduced in the virtual space 11, and information for arranging an object to be used in the content. The content may include, for example, game content and content representing landscapes that resemble those of the real society. The data for displaying an avatar object may contain, for example, image data schematically representing a communication partner who is established as a chat partner in advance, and a photo of the communication partner.

The user information 1433 stores, for example, a program for causing the computer 200 to function as a control device for the HMD system 100, an application program that uses each piece of content stored in the object information 1432, and a user ID and a password that are required to execute the application program. The data and programs stored in the memory module 530 are input by the user 5 of the HMD system 100. Alternatively, the processor 210 downloads programs or data from a computer (e.g., server 600) that is managed by a business operator providing the content, and stores the downloaded programs or data into the memory module 530.

[Operation Between Computers Through Communication Between Two Users]

Now, a description is given of operation of the computers 200 and 200B at the time when the two users 5 and 5B communicate to/from each other via the virtual space 11. In the following, a description is given of a case in which the user 5B wearing the HMD 120B connected to the computer 200B utters sound toward the user 5 wearing the HMD 120 connected to the computer 200.

(Transmission Side) In at least one aspect, the user 5B wearing the HMD 120B utters sound toward the microphone 170 in order to chat with the user 5. The sound signal of the utterance is transmitted to the computer 200B connected to the HMD 120B. The sound control module 1429 converts the sound signal into sound data, and associates a timestamp representing the time of detection of the utterance with the sound data. The timestamp is, for example, time data of an internal clock of the processor 210. In at least one aspect, time data on a time when the communication control module 540 converts the sound signal into sound data is used as the timestamp.

When the user 5B is uttering sound, a motion of the line of sight of the user 5B is detected by the eye gaze sensor 140. The result (eye tracking data) of detection by the eye gaze sensor 140 is transmitted to the computer 200B. The line-of-sight detection module 1426 identifies each position (e.g., position of pupil) representing a change in line of sight of the user 5B based on the detection result.

The computer 200B transmits the sound data and the eye tracking data to the computer 200. The sound data and the eye tracking data are first transmitted to the server 600. The server 600 refers to a destination of each header of the sound data and the eye tracking data, and transmits the sound data and the eye tracking data to the computer 200. At this time, the sound data and the eye tracking data may arrive at the computer 200 at different times.

(Reception Side)

The computer 200 receives the data transmitted by the computer 200B from the server 600. In at least one aspect, the processor 210 of the computer 200 detects reception of the sound data based on the data transmitted by the communication control module 540. When the processor 210 identifies the transmission source (i.e., computer 200B) of the sound data, the processor 210 serves as the chat control module 1428 to cause a chat screen to be displayed on the monitor 130 of the HMD 120.

The processor 210 further detects reception of the eye tracking data. When the processor 210 identifies a transmission source (i.e., computer 200B) of the eye tracking data, the processor 210 serves as the virtual object generation module 1425 to generate data for displaying the avatar object of the user 5B.

The synchronization module 1427 synchronizes timings of outputting the sound data and eye tracking data that are received from the computer 200B. For example, the synchronization module 1427 compares a transmission source identification number and time data contained in the sound data with a transmission source identification number and time data contained in the eye tracking data. When those pieces of data match each other, the synchronization module 1427 determines that the sound data and the eye tracking data are transmitted by the same computer 200B, and outputs data for displaying an avatar object and the sound data at the same timing to the HMD 120.

In at least one aspect, the processor 210 receives eye tracking data before reception of sound data. In this case, when detecting the transmission source identification number from the eye tracking data, the processor 210 determines that there is sound data transmitted in association with the eye tracking data. The processor 210 waits to output data for displaying an avatar object until the processor 210 receives sound data containing the same transmission source identification number and time data as the transmission source identification number and time data contained in the eye tracking data.

Further, in at least one aspect, the processor 210 receives sound data before reception of eye tracking data. In this case, when detecting the transmission source identification number from the sound data, the processor 210 determines that there is eye tracking data transmitted in association with the sound data. The processor 210 waits to output the sound data until the processor 210 receives eye tracking data containing the same transmission source identification number and time data as the transmission source identification number and time data contained in the sound data.

In at least aspect described above, pieces of time data to be compared do not completely indicate the same time, i.e., the timestamps are different.

When confirming reception of sound data and eye tracking data containing the same time data, the processor 210 outputs the sound data to the speaker 180, and outputs, to the monitor 130, data for displaying an avatar object in which the change that is based on the eye tracking data is translated. As a result, the user 5 is able to recognize the sound uttered by the user 5B and the avatar at the same timing, and is thus able to enjoy a chat without feeling a time lag (e.g., deviation between change in avatar object and timing of outputting sound) due to delay of signal transmission.

In the same manner as in the processing described above, the processor 210 of the computer 200B used by the user 5B is also able to synchronize the timing of outputting sound data and the timing of outputting an avatar object in which the movement of the line of sight of the user 5 is translated. As a result, the user 5B is also able to recognize output of the sound uttered by the user 5 and the change in avatar object at the same timing, and is thus able to enjoy a chat without feeling a time lag due to delay of signal transmission.

[Outline of Chat]

Figure 15:
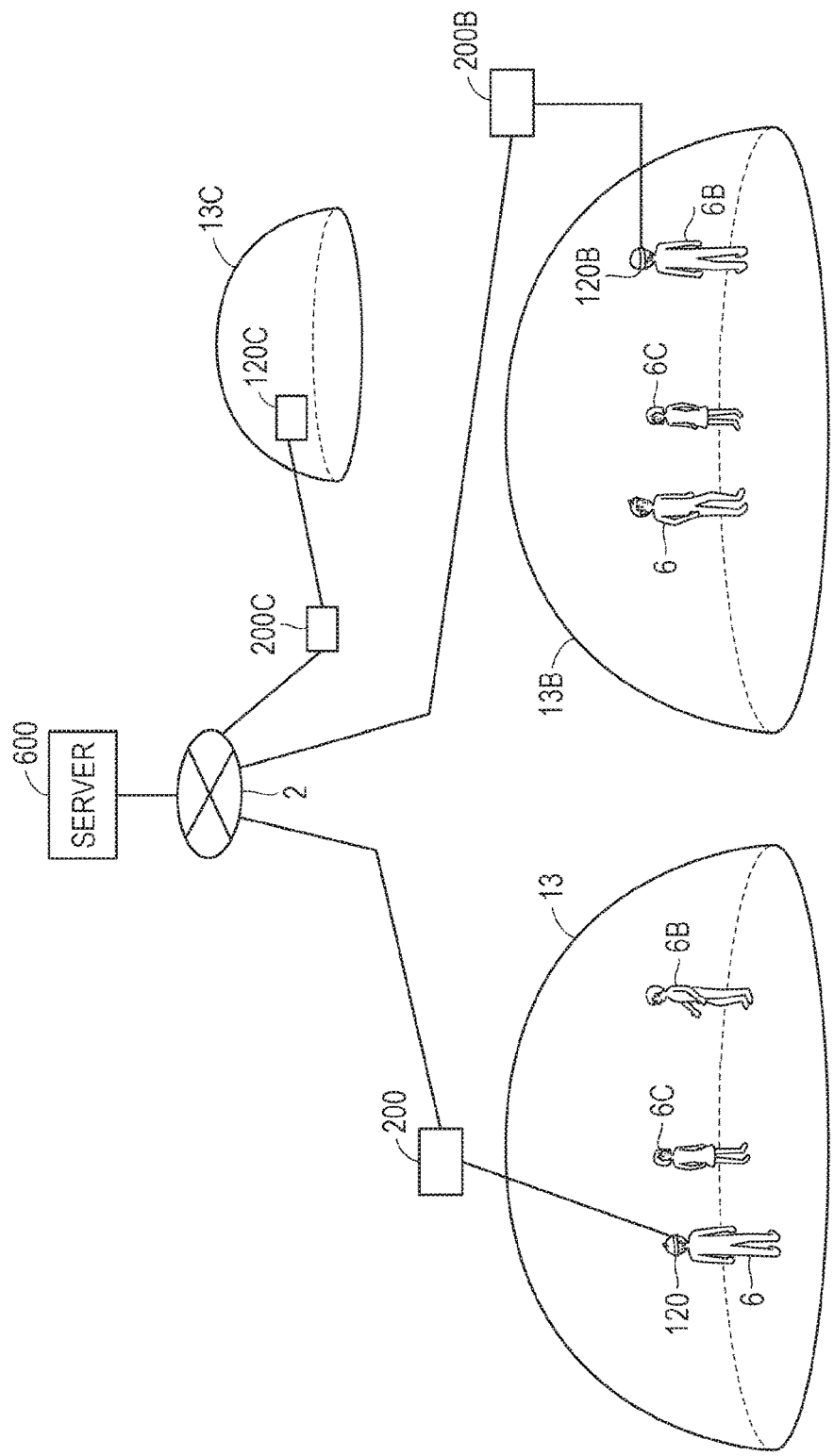
FIG. 15 A conceptual diagram of respective virtual spaces 11 presented by computers according to at least one embodiment of this disclosure.

Next, a description is given of an outline of a chat via the virtual space, which is performed in accordance with at least one embodiment, with reference to FIG. 15. FIG. 15 is a conceptual diagram of one mode of representation of the respective virtual spaces 11 presented by the computers 200, 200B, and 200C according to at least one embodiment of this disclosure.

In FIG. 15, each of the computers 200, 200B, and 200C is able to communicate to/from the server 600 via the network 2. The computers 200, 200B, and 200C provide virtual space images 13, 13B, and 13C via the connected HMDs 120, 120B, and 120C, respectively. The virtual space images 13, 13B, and 13C present the avatar objects 6, 6B, and 6C corresponding to respective users of the computers 200, 200B, and 200C, respectively.

For example, the avatar objects 6, 6B, and 6C correspond to the users 5, 5B, and 5C, respectively. For example, the avatar objects 6B and 6C are presented as communication partners of the user 5 in the virtual space image 13 visually recognized by user 5. The avatar objects 6 and 6C are displayed as communication partners of the user 5B in the virtual space image 13B visually recognized by the user 5B. The avatar objects 6 and 6B are displayed as communication partners of the user 5C in the virtual space image 13C visually recognized by the user 5C.

The HMDs 120, 120B, and 120C transmit pieces of motion detection data corresponding to the positions and inclinations of the users 5, 5B, and 5C to the server 600 via the computers 200, 200B, and 200C, respectively. The motion detection data may contain eye tracking data. The server 600 transmits the motion detection data received from the HMD 120 to the HMDs 120B and 120C. The HMDs 120B and 120C change the mode (e.g., position and inclination of avatar object) of display of an avatar object, which is a chat partner presented in the virtual space 11, in accordance with the motion detection data.

In at least one aspect, the HMDs 120, 120B, and 120C transmit pieces of sound data corresponding to an utterance of the users 5, 5B, and 5C to the server 600, respectively. The server 600 transmits, for example, the sound data and eye tracking data received from the HMD 120 to the computers 200B and 200C. The computers 200B and 200C change the mode (e.g., direction of eyes and head) of display of the avatar object in accordance with the eye tracking data. The HMDs 120B and 120C output sound that is based on the sound data from the speakers 180.

In this manner, when the user 5 wearing the HMD 120 moves the eyes and utters sound, the mode of display of the avatar object corresponding to the user 5 is changed in the virtual space 11 presented by the other HMDs 120B and 120C in the state of being capable of communicating to/from the HMD 120, and sound is output from the speaker 180. The timing of changing the display mode and the timing of outputting sound are synchronized, and thus in communication via the virtual space 11, each communication partner performs communication using sound and an avatar object without feeling strange.

[Synchronization]

Figure 16:
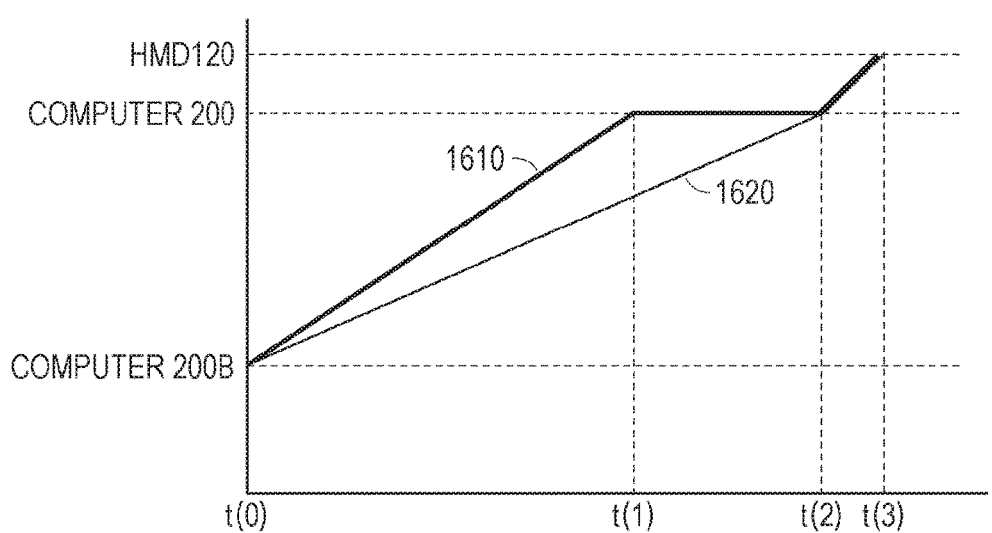
FIG. 16 A timing chart of a mode of synchronization between sound data and eye tracking data according to at least one embodiment of this disclosure.

Now, with reference to FIG. 16, a description is given of synchronization in the system 100 according to at least one embodiment of this disclosure. FIG. 16 is a timing chart of a mode of synchronization between the sound data and the eye tracking data according to at least one embodiment of this disclosure. In at least one embodiment of this disclosure, delay of signal transmission from the HMD 120B (or computer 200B to which HMD 120B is connected) to the computer 200 to which the HMD 120 is connected is described. In at least one aspect, the computer 200 connected to the HMD 120 and the computer 200B connected to the HMD 120B are executing a chat application for communicating to/from each other via the virtual space 11.

When the user 5B utters sound at a time t(0), the computer 200B detects the line of sight of the user 5B at that time, and converts content of the utterance into sound data. The result of detecting the line of sight contains, for example, eye tracking data. The eye tracking data contains a plurality of data records acquired within a predetermined period of time. Each data record contains an x coordinate value and a y coordinate value of a viewpoint, data on a time at which each coordinate value is acquired, and an identification number of a transmission source (e.g., HMD 120B) of the data record. The computer 200B transmits the sound data and the eye tracking data to the computer 200 based on a destination (e.g., user 5) designated by the user 5B at the time of executing the chat application.

Deviation may occur between arrival of the sound data and arrival of the eye tracking data. For example, in at least one aspect, as shown in a graph 1610, the eye tracking data arrives at the computer 200 before arrival of the sound data shown in a graph 1620.

As an example, at a time t(1), the eye tracking data (graph 1610) has arrived at the computer 200, but the sound data (graph 1620) has not arrived at the computer 200. Therefore, the computer 200 stores data on the avatar object changed based on the eye tracking data into an internal volatile memory without outputting the data to the HMD 120.

At a time t(2), the sound data arrives at the computer 200. The computer 200 determines whether or not the time data and the identification number of the transmission source contained in the sound data match the time data and identification number of the transmission source contained in the eye tracking data received at the time t(1). When those pieces of information match each other, at a time t(3), the computer 200 outputs, to the HMD 120, data for displaying the avatar object changed based on the eye tracking data and the sound data. The HMD 120 displays an avatar object on the monitor 130 based on the data, and outputs sound based on the sound data from the speaker 180. The user 5 wearing the HMD 120 recognizes the change in line of sight translated in the avatar object, and recognizes content of the utterance of the user 5B. At this time, the change in mode of display of the avatar object and the output of sound are synchronized, and thus the user 5 does not feel strange.

[Algorithm]

In the following, a description is given of an algorithm for implementing operation of the HMD system 100 according to at least one embodiment of this disclosure.

[Control Structure]

Figure 17:
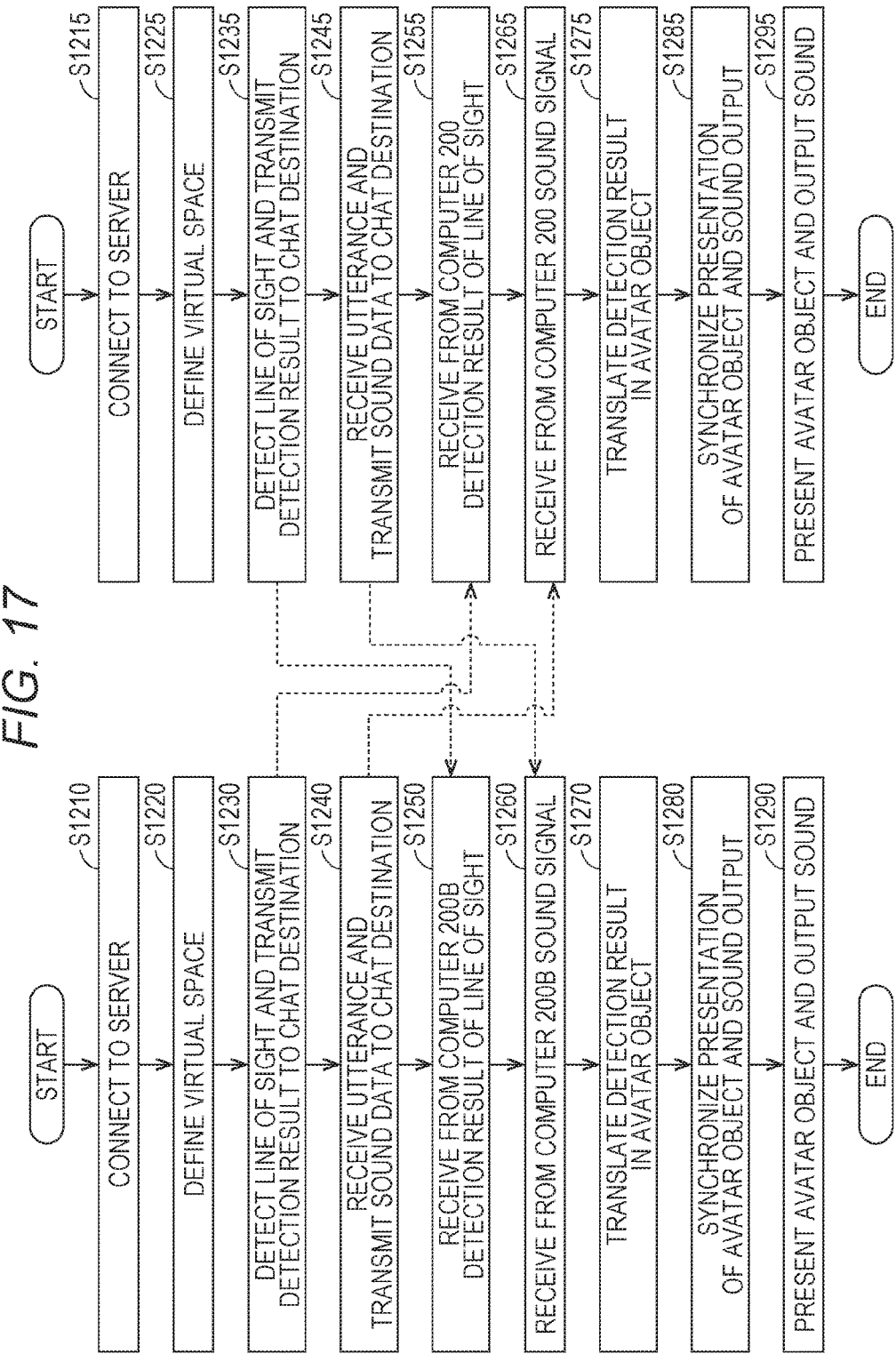
FIG. 17 A flowchart of a part of processing to be executed by a first HMD and a second HMD according to at least one embodiment of this disclosure.

First, a description is given of a control structure in the system 100 with reference to FIG. 17. FIG. 17 is a flowchart of a part of processing to be executed by a first HMD (e.g., HMD 120) and a second HMD (e.g., HMD 120B) according to at least one embodiment of this disclosure.

In Step S1210, the computer 200, which is connected to the HMD 120, connects to the server 600 to start a chat via the virtual space 11 based on an operation of the user 5. In Step S1215, the computer 200B, which is connected to the HMD 120, connects to the server 600 to start a chat via the virtual space 11 based on an operation of the user 5B.

In Step S1220, the processor 210 of the computer 200 serves as the virtual space definition module 1424 to define the virtual space 11. After that, the processor 210 serves as the chat control module 1428 to start communication to/from the computer 200B. In Step S1225, the processor 210 of the computer 200B serves as the virtual space definition module 1424 to define the virtual space 11. After that, the processor 210 serves as the chat control module 1428 to start communication to/from the computer 200.

In Step S1230, the processor 210 detects a motion of the line of sight of the user 5 based on a signal output from the eye gaze sensor 140. The detection result is, for example, eye tracking data. The processor 210 transmits the eye tracking data to a chat partner, namely, the HMD 120B. In Step S1235, the processor 210 of the computer 200B detects a motion of the line of sight of the user 5B based on a signal output from the eye gaze sensor 140. The detection result is, for example, eye tracking data. The processor 210 transmits the eye tracking data to a chat partner, namely, the HMD 120.

In Step S1240, the processor 210 receives an utterance of the user 5 based on reception of a signal output from the microphone 170, and transmits sound data based on the signal to the chat partner (HMD 120B). In Step S1245, the processor 210 of the computer 200B receives an utterance of the user 5B based on reception of a signal output from the microphone 170, and transmits sound data based on the signal to the chat partner (HMD 120).

In Step S1250, the processor 210 receives the result of detecting a motion of the line of sight of the user 5B wearing the HMD 120B from the computer 200B. In Step S1255, the processor 210 of the computer 200B receives the result of detecting a motion of the line of sight of the user 5 wearing the HMD 120 from the computer 200.

In Step S1260, the processor 210 receives sound data based on an utterance of the user 5B from the computer 200B. In Step S1265, the processor 210 of the computer 200B receives sound data based on an utterance of the user 5 from the computer 200.

In Step S1270, the processor 210 translates the detection result (eye tracking data) in the avatar object to generate data on the avatar object in which the change in line of sight of the user 5B is translated. In Step S1275, the processor 210 of the computer 200B translates the detection result (eye tracking data) in the avatar object to generate data on the avatar object in which the change in line of sight of the user 5 is translated.

In Step S1280, the processor 210 performs processing of synchronizing the timing of presenting the avatar object to the HMD 120 and the timing of outputting the sound from the speaker 180. For example, in at least one aspect, when the computer 200 receives eye tracking data acquired by the HMD 120B at a certain timing from the computer 200B before reception of sound data, the processor 210 waits to output data on the avatar object generated in Step S1270 until reception of the sound data. When the processor 210 receives the sound data, the processor 210 determines whether or not the transmission source of the sound data and the timing of acquiring the sound data are the same as the transmission source of the eye tracking data and the timing of acquiring the eye tracking data. When those transmission sources and acquisition timings are the same, the processor 210 switches the processing to Step S1290.

In Step S1285, the processor 210 of the computer 200B performs processing of synchronizing the timing of presenting the avatar object to the HMD 120 and the timing of outputting the sound from the speaker 180. For example, in at least one aspect, when the computer 200B receives eye tracking data acquired by the HMD 120 at a certain timing from the computer 200 before reception of sound data, the processor 210 waits to output data on the avatar object generated in Step S1275 until reception of the sound data. When the processor 210 receives the sound data, the processor 210 determines whether or not the transmission source of the sound data and the timing of acquiring the sound data are the same as the transmission source of the eye tracking data and the timing of acquiring the eye tracking data. When those transmission sources are the same, the processor 210 switches the processing to Step S1295.

In Step S1290, the processor 210 outputs the data on the avatar object and the sound data at the same timing, and the user 5 wearing the HMD 120 recognizes that the direction of the line of sight of the avatar object displayed on the monitor 130 has changed. At the same time, the user 5 is able to hear the utterance of the user 5B.

In Step S1295, the processor 210 of the computer 200B outputs the data on the avatar object and the sound data at the same timing, and the user 5B wearing the HMD 120b recognizes that the direction of the line of sight of the avatar object displayed on the monitor 130 has changed. At the same time, the user 5B is able to hear the utterance of the user 5B.

In at least one aspect, the computer 200 receives sound data acquired by the HMD 120B at a certain timing from the computer 200B before reception of eye tracking data. In this case, the processing of Step S1260 is performed before the processing of Step S1250. The processor 210 waits to output the sound data until reception of the eye tracking data. When the processor 210 receives the eye tracking data, the processor 210 determines whether or not the transmission source of the eye tracking data and the timing of acquiring the eye tracking data are the same as the transmission source of the sound data and the timing of acquiring the sound data. When those transmission sources are the same, the processor 210 outputs the data on the avatar object and the sound data at the same timing after reception of the eye tracking data. In this case too, the user 5 wearing the HMD 120 recognizes that the direction of the line of sight of the avatar object displayed on the monitor 130 has changed. At the same time, the user 5 is able to hear the utterance of the user 5B.

In at least one aspect, the computer 200B receives sound data acquired by the HMD 120 at a certain timing from the computer 200 before reception of eye tracking data. In this case, the processing of Step S1265 is performed before the processing of Step S1255. The processor 210 waits to output the sound data until reception of the eye tracking data. When the processor 210 receives the eye tracking data, the processor 210 determines whether or not the transmission source of the eye tracking data and the transmission source of the sound data are the same. When those transmission sources are the same, the processor 210 outputs the data on the avatar object and the sound data at the same timing after reception of the eye tracking data. In this case too, the user 5B wearing the HMD 120B recognizes that the direction of the line of sight of the avatar object displayed on the monitor 130 has changed. At the same time, the user 5B is able to hear the utterance of the user 5.

[Data Structure]

Next, a description is given of a structure of data to be transferred in the HMD system 100 according to at least one embodiment of this disclosure with reference to FIG. 18A to FIG. 18D. FIG. 18A represents eye tracking data acquired by the HMD 120 used by the user 5 according to at least one embodiment of this disclosure. FIG. 18B represents sound data that is based on an utterance of the user 5. FIG. 18C represents eye tracking data acquired by the HMD 120B used by the user 5B. FIG. 18D represents sound data that is based on an utterance of the user 5.

Referring to FIG. 18A, eye tracking data 1810 contains a user ID, an x coordinate value, a y coordinate value, an elapsed time, and a data ID. The user ID identifies a user whose line of sight is detected, that is, a transmission source of the eye tracking data 1810. The x coordinate value represents an x coordinate value of a center coordinate (pupil center point) of a pupil of the user 5 at the time when the line of sight is detected. The y coordinate value represents a y coordinate value of the center coordinate of the pupil of the user 5 at the time when the line of sight is detected. The elapsed time represents a time that has elapsed since start of a chat. During a chat, the line of sight is detected continuously, for example, periodically, and thus the elapsed time identifies a timing at which the line of sight is detected. Instead of the elapsed time, an actual time in the real space, for example, a clock of the computer 200 or time information contained in a positioning signal may be used in at least one embodiment. The data ID identifies data acquired at each timing.

Referring to FIG. 18B, the sound data 1820 contains a user ID, sound data, an elapsed time, and a data ID. The user ID identifies a user whose line of sight is detected, that is, a transmission source of the sound data 1820. The sound data is digital sound data generated from an utterance of the user 5. The elapsed time represents a time that has elapsed since start of a chat in the same manner as in the eye tracking data

1810. Instead of the elapsed time, an actual time in the real space, for example, a clock of the computer 200 or time information contained in a positioning signal may be used in at least one embodiment. The data ID identifies data acquired at each timing.

Referring to FIG. 18C, the eye tracking data 1830 has a similar structure as that of the eye tracking data 1810 shown in FIG. 18A. Thus, a description of the same structure is not repeated here.

Referring to FIG. 18D, the sound data 1840 has a similar structure as that of the sound data 1820 shown in FIG. 18B. Thus, a description of the same structure is not repeated here.

Figure 19:
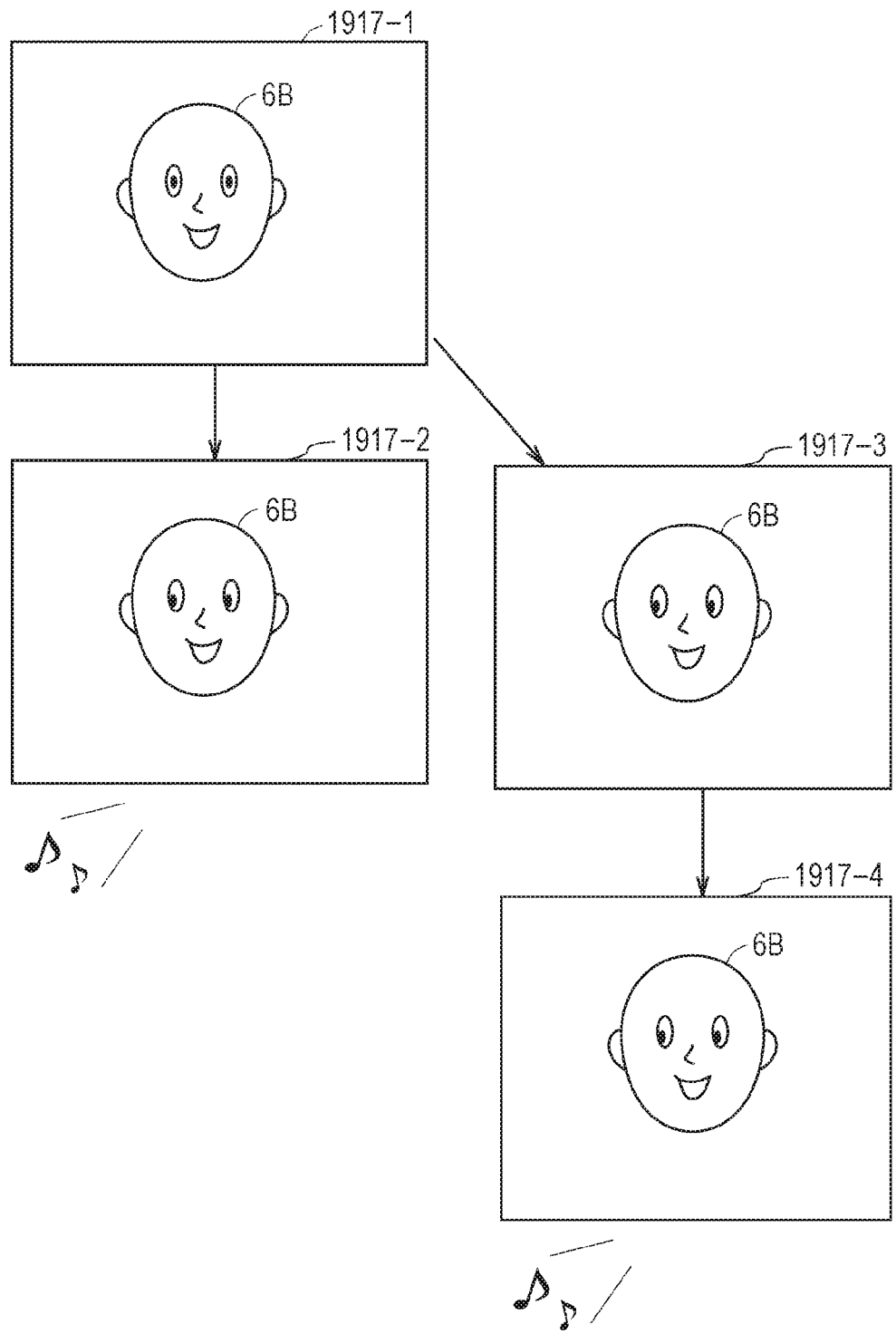
FIG. 19 A diagram of transition of chat screens displayed on a monitor of the HMD according to at least one embodiment of this disclosure.

Now, a description is given of an output mode of the HMD 120 according to at least one embodiment of this disclosure with reference to FIG. 19. FIG. 19 is a diagram of transition of a chat screen displayed on the monitor 130 of the HMD 120 according to at least one embodiment of this disclosure.

(When Update of Avatar Object and Output of Sound are Synchronized)

In a chat screen 1917-1, in at least one aspect, when the user 5 starts to chat with the user 5B, the monitor 130 of the HMD 120 displays the avatar object 6B of the user 5B. When the user 5B wearing the HMD 120B utters sound while moving his or her eyes, the line-of-sight detection result (eye tracking data 1830) and the sound data 1840 are transmitted from the computer 200B to the computer 200. The processor 210 of the computer 200 synchronizes the timing of presenting the avatar object and the timing of outputting the sound data.

In a chat screen 1917-2, after that, the HMD 120 outputs the avatar object 6B in which a motion of the eyes of the user 5B is translated and sound that is based on an utterance at the same timing. With this, the user 5 is able to recognize the change in line of sight of the avatar object 6B and the output of sound at the same timing, and thus does not feel strange in a chat via the virtual space 11.

(When Update of Avatar Object and Output of Sound are not Synchronized)

In contrast, in a chat screen 1917-3, in at least one aspect, when output of sound data and change of the avatar object 6B are not synchronized in a chat via the virtual space 11, for example, only the change in line of sight of the avatar object 6B is displayed first on the monitor 130. After that, in a chat screen 1917-4, the sound is output from the speaker 180 of the HMD system 100 with time delay. Therefore, in this case, timings of changing the avatar object 6B and outputting sound are different, and hence the user 5 may feel strange.

As described above, in the HMD system 100 according to at least one embodiment of this disclosure, the HMD 120 synchronizes the timing of presenting the avatar object 6B and the timing of outputting sound in video-and-sound communication like a chat via the virtual space 11. As a result, the user 5 wearing the HMD 120 recognizes the change of the avatar object 6B that is based on movement of the line of sight of the user 5B, who is a chat partner, and the output of sound at the same time, and is thus able to continue chatting without feeling strange.

In the example described above, the HMD 120 of the system 100 is configured to synchronize video and sound by synchronizing the timing of presenting the line of sight of the avatar object and the timing of outputting sound. However, a motion of the avatar object is not limited to a motion of the line of sight (motion of eye balls). In at least one embodiment of this disclosure, a description is given of synchronization between sound and a motion (video corresponding thereto) of the avatar object other than the line of sight.

[Configuration of HMD System]

Figure 20:
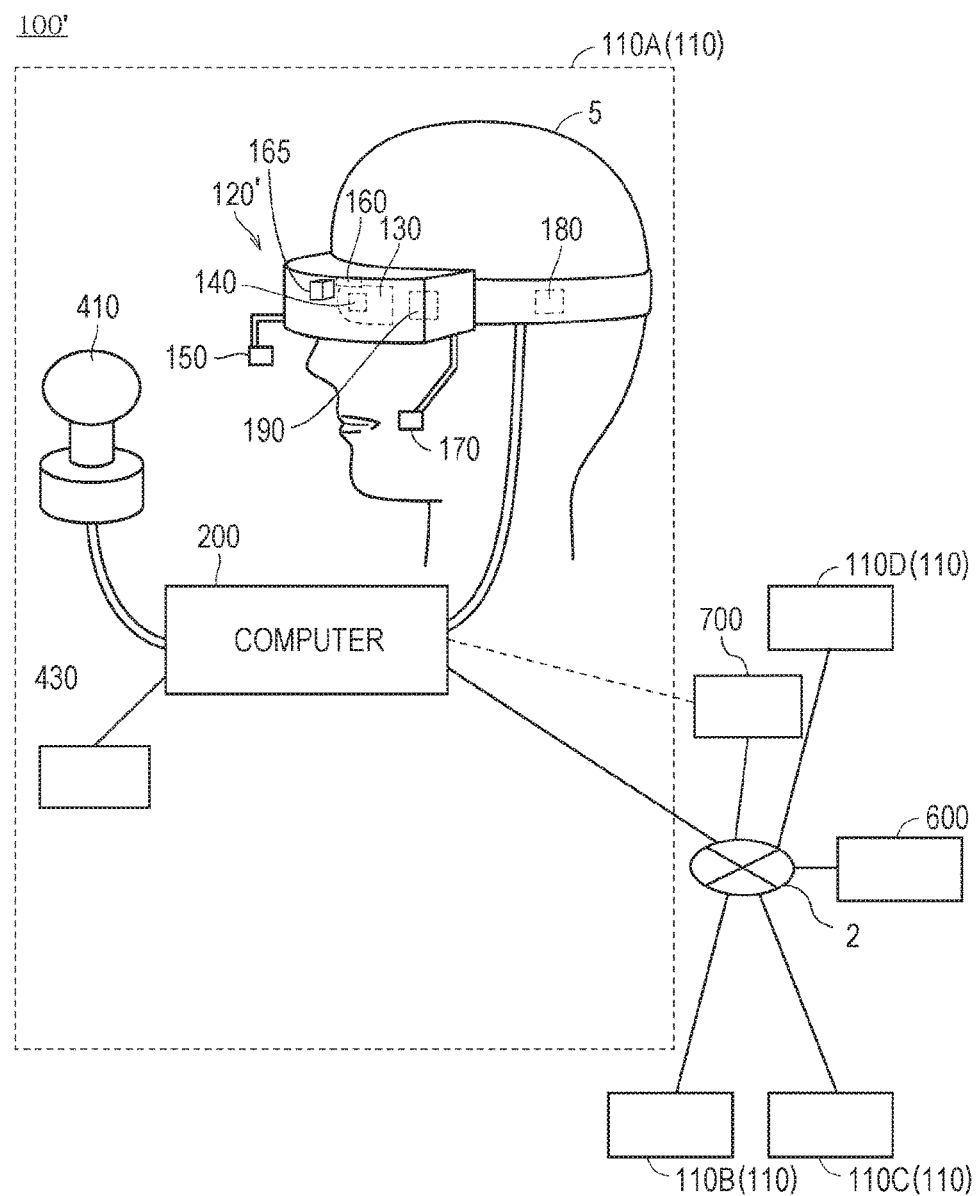
FIG. 20 A diagram of a schematic configuration of an HMD system according to a modification example of this disclosure.
Figure 21:
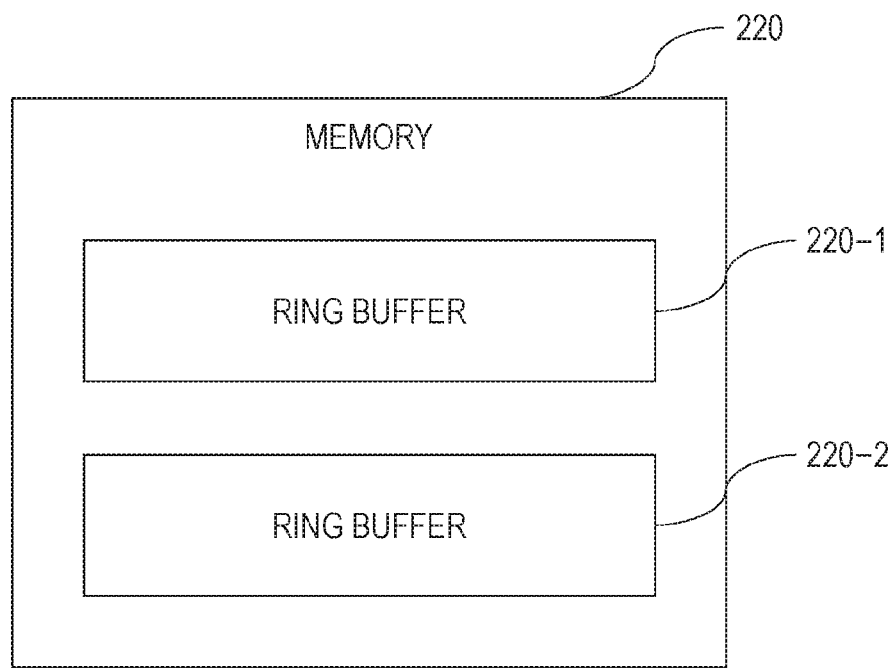
FIG. 21 A block diagram of a hardware configuration of a memory of a computer according to the modification example.

FIG. 20 is a schematic diagram of a configuration of the HMD system 100 according to the modification example. FIG. 21 is a block diagram of an example of a hardware configuration of the memory 220 according to the modification example. This HMD system 100' differs from the HMD system 100 in FIG. 1 in the points that this HMD system 100 includes an HMD 120' and does not include a controller 300. The hardware configuration of the computer 200 in FIG. 21 is similar to the hardware configuration in FIG. 2, except that the memory 220 includes ring buffers 220-1 and 220-2. Therefore, a description of the parts of the hardware configuration that are the same is not repeated here.

The HMD 120' is different from the HMD 120 described with reference to FIG. 1 in that the HMD system 100' includes the first camera 150, the second camera 160, and a third camera 165. The first camera 150 photographs a lower part of the face of the user 5. As an example, the first camera 150 photographs the nose, the mouth, and other such face parts of the user 5. The second camera 160 photographs the eyes, eyebrows, and other such face parts of the user. Apart of a casing of the HMD 120' on the user 5 side is defined as the inside of the HMD 120', and another part of the casing of the HMD 120' opposite to the user 5 is defined as the outside of the HMD 120'. In at least one aspect, the first camera 150 is arranged outside of the HMD 120', and the second camera 160 is arranged inside of the HMD 120'. In FIG. 20, the first camera 150 is connected to a frame extending from the outside of the HMD 120', and photographs the lower part of the face of the user 5. Images generated by the first camera 150 and the second camera 160 are input to the computer 200.

The third camera 165 is capable of acquiring depth information on a target object. In at least one embodiment, the third camera 165 acquires the depth information on a target object in accordance with a time-of-flight method. In at least one embodiment, the third camera 165 acquires the depth information on a target object in accordance with a pattern irradiation method. In at least one embodiment of this disclosure, the third camera 165 may be a stereo camera capable of photographing a target object in two or more different directions. The third camera 165 may be an infrared camera. The third camera 165 is mounted to the upper part of the outside of the HMD 120', and photographs a part of the body of the user 5. In the following, as an example, the third camera 165 photographs the hand of the user 5. The third camera 165 outputs the acquired depth information on the target object (hand) to the computer 200.

The configurations of the HMD system 100B used by the user 5B and the HMD system 100C used by the user 5C are the same as that of the HMD system 100, and thus a description thereof is omitted here. In the following, a description is given by assigning components of the HMD system 100B with a symbol "B" and components of the HMD system. 100C with a symbol "C". For example, the HMD 120B is included in the HMD system 100B. A virtual space presented by the computer 200B is defined as the virtual space 11B, and a virtual space presented by the computer 200C is defined as a virtual space 11C.

[Module Configuration of Control Apparatus]

Figure 22:
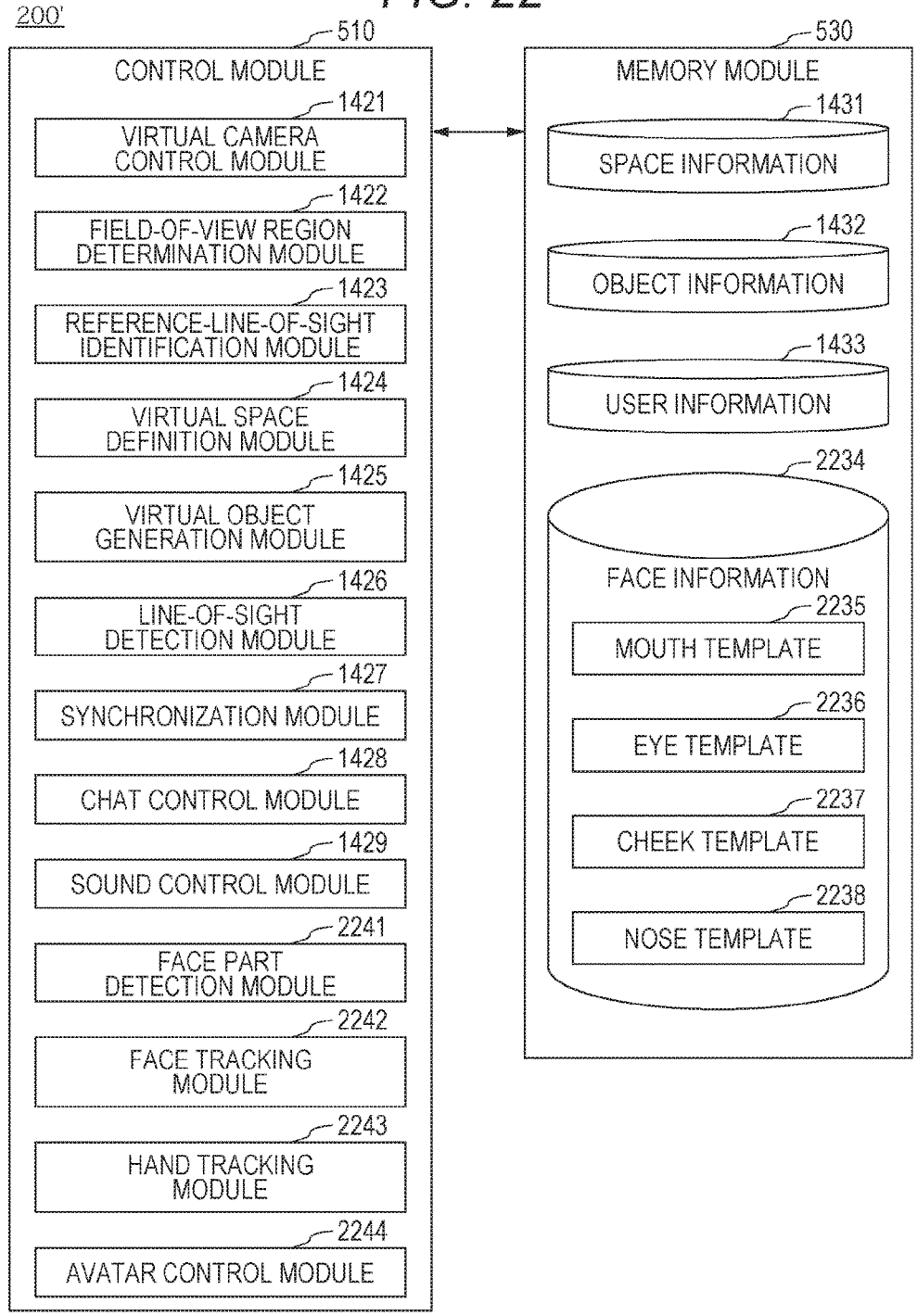
FIG. 22 A block diagram of a module configuration of the computer according to the modification example.

FIG. 22 is a block diagram of a module configuration of the computer 200' according to at least one embodiment. The module configuration of the computer 200' in FIG. 22 is different from that of the computer 200 described with reference to FIG. 14 in the following points.

Referring to FIG. 22, the control module 510 according to at least one embodiment further includes a face part detection module 2241, a face tracking module 2242, and a hand tracking module 2243. The memory module 530 according to at least one embodiment further stores face information 2234.

The face part detection module 2241 detects face parts (e.g., mouth, eyes, cheeks, and nose) forming the face of the user 5 from images of the face of the user 5, which are generated by the first camera 150 and the second camera 160. The face tracking module 2242 detects a motion (shape) of each face part detected by the face part detection module 2241. Processing of the face part detection module 2241 and the face tracking module 2242 is described later with reference to FIG. 23 to FIG. 25.

The hand tracking module 2243 detects (tracks) the position of a part of the body of the user 5. In at least one embodiment, the hand tracking module 2243 detects a position of the hand of the user 5 in the uvw visual-field coordinate system set in the HMD system 100 based on the depth information input from the third camera 165. Processing of the hand tracking module 2243 is described later with reference to FIG. 27 to FIG. 29.

The face information 2234 contains a template prepared in advance for the face part detection module 2241 to detect face parts of the user 5. As an example, the face information 2234 contains a mouth template 2235, an eye template 2236, a cheek template 2237, and a nose template 2238. Each of the templates may be an image corresponding to each of the parts forming the face. For example, the mouth template 2235 may be an image of a mouth. Each template may include a plurality of images.

The virtual object generation module 1425 translates motions of face parts detected by the face tracking module 2242 in the face of the avatar object arranged in the virtual space 11. The virtual object generation module 1425 translates a motion of the hand detected by the hand tracking module 2243 in the hand of the avatar object arranged in the virtual space 11.

[Face Tracking]

Figure 23:
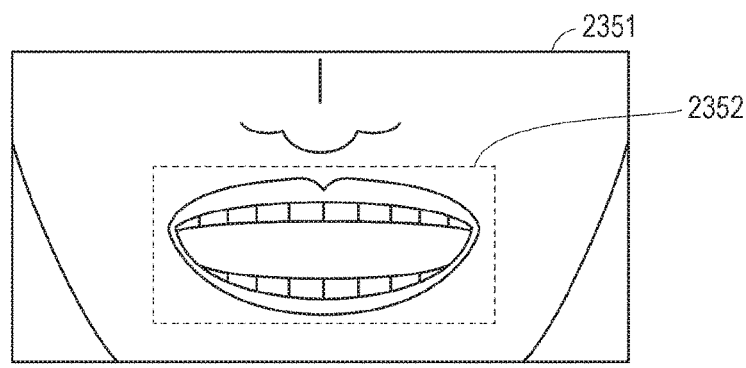
FIG. 23 A diagram of a facial image of a user photographed by a first camera according to at least one embodiment of this disclosure.
Figure 24:
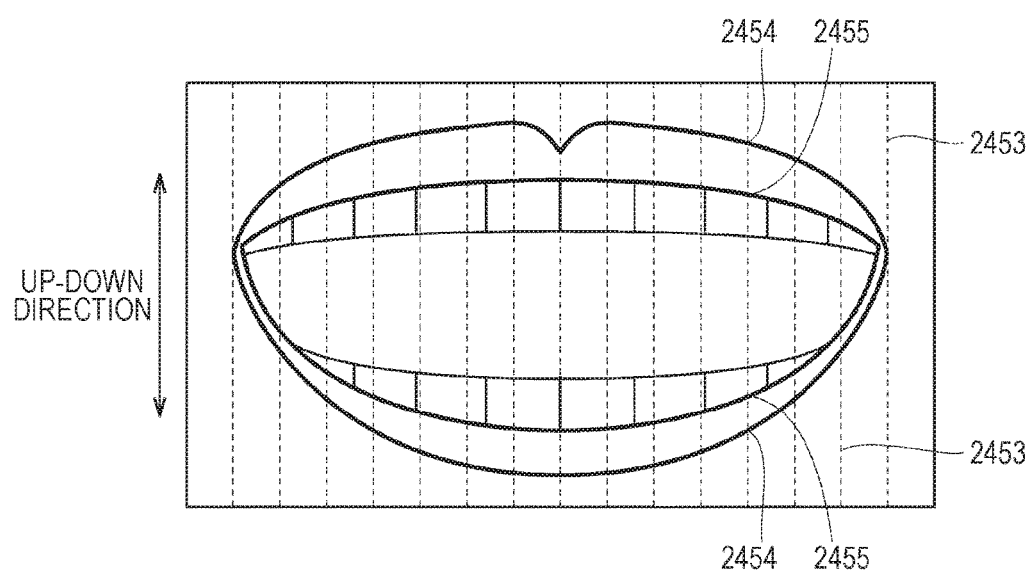
FIG. 24 A diagram of processing in which the face tracking module detects a shape of a mouth according to at least one embodiment of this disclosure.
Figure 25:
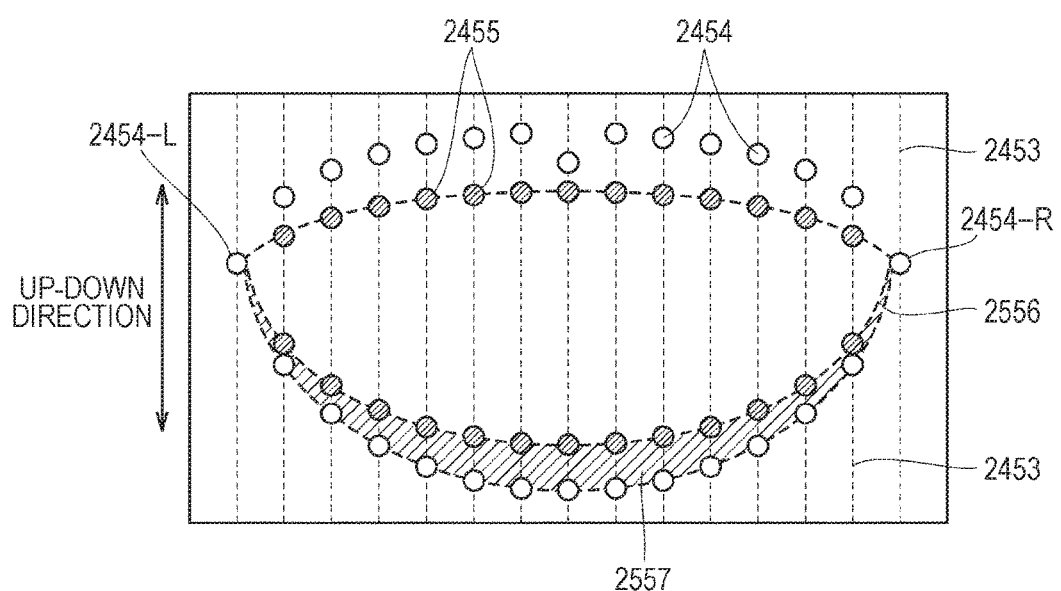
FIG. 25 A diagram of processing in which a face tracking module detects the shape of the mouth according to at least one embodiment of this disclosure.

In the following, with reference to FIG. 23 to FIG. 25, a detecting a motion (shape) of the face of the user is described. In FIG. 23 to FIG. 25, detecting a motion of the mouth of the user is described as an example. The detection method described with reference to FIG. 23 to FIG. 25 is not limited to detection of a motion of the mouth of the user, but may be applied to detection of motions of other parts (e.g., eyes, eyebrows, cheeks, and nose) forming the face of the user.

FIG. 23 is a view of a face image 2351 of the user photographed by the first camera 150 according to at least one embodiment of this disclosure. The face image 2351 includes the nose and the mouth of the user 5.

The face part detection module 2241 identifies a mouth region 2352 from the face image 2351 by pattern matching using the mouth template 2235 stored in the face information 2234. In at least one aspect, the face part detection module 2241 sets a rectangular comparison region in the face image 2351, and changes the size, position, and angle of this comparison region to calculate a similarity degree between an image of the comparison region and an image of the mouth template 2235. The face part detection module 2241 may identify, as the mouth region 2352, a comparison region for which a similarity degree larger than a threshold value determined in advance has been calculated.

The face part detection module 2241 may further determine whether or not the comparison region corresponds to the mouth region based on a relative positional relationship between positions of other face parts (e.g., eyes and nose) and the position of the comparison region for which the calculated similarity degree is larger than the threshold value.

The face tracking module 2242 detects a more detailed shape of the mouth from the mouth region 2352 detected by the face part detection module 2241.

FIG. 24 is a flowchart of processing of detecting the shape of the mouth by the face tracking module 2242 according to at least one embodiment of this disclosure. Referring to FIG. 24, the face tracking module 2242 sets a contour detection line 2453 for detecting the shape of the mouth (contour of lips) contained in the mouth region 2352. A plurality of contour detection lines 2453 are set at predetermined intervals in a direction (hereinafter referred to as "lateral direction") orthogonal to a height direction (hereinafter referred to as "longitudinal direction") of the face.

The face tracking module 2242 may detect change in brightness value of the mouth region 2352 along each of the plurality of contour detection lines 2453, and identify a position at which the change in brightness value is abrupt as a contour point. More specifically, the face tracking module 2242 may identify, as the contour point, a pixel for which a brightness difference (namely, change in brightness value) between the pixel and an adjacent pixel is equal to or larger than a threshold value determined in advance. The brightness value of a pixel is obtained by, for example, integrating RBG values of the pixel with predetermined weighting.

The face tracking module 2242 identifies two types of contour points from the image corresponding to the mouth region 2352. The face tracking module 2242 identifies a contour point 2454 corresponding to a contour of the outer side of the mouth (lips) and a contour point 2455 corresponding to a contour of the inner side of the mouth (lips). In at least one aspect, when three or more contour points are detected on one contour detection line 2453, the face tracking module 2242 may identify contour points on both ends of the contour detection line 2453 as the outer contour points 2454. In this case, the face tracking module 2242 may identify contour points other than the outer contour points 2454 as the inner contour points 2455. When two or less contour points are detected on one contour detection line 2453, the face tracking module 2242 may identify the detected contour points as the outer contour points 2454.

FIG. 25 is a flowchart of processing of detecting the shape of the mouth by the face tracking module 2242 according to at least one embodiment of this disclosure. In FIG. 25, the outer contour points 2454 and the inner contour points 2455 are indicated by white circles and hatched circles, respectively.

The face tracking module 2242 interpolates the space between the inner contour points 2455, to thereby identify a mouth shape 2556 (degree of opening of mouth). In at least one aspect, the face tracking module 2242 identifies the mouth shape 2556 using a nonlinear interpolation method, for example, spline interpolation. In this case, the inner contour points 2455 can be said to be feature points representing the mouth shape 2556. In at least one aspect, the face tracking module 2242 interpolates the space between the outer contour points 2454, to thereby identify the mouth shape 2556. In at least one aspect, the face tracking module 2242 identifies the mouth shape 2556 by removing contour points that greatly deviate from an assumed mouth shape (predetermined shape that may be formed by upper lip and lower lip of person) and using left contour points. In this manner, the face tracking module 2242 may identify a motion (shape) of the mouth of the user.

The face tracking module 2242 may also detect the upper lip and the lower lip that form the mouth. In at least one embodiment, the face tracking module 2242 identifies, among the outer contour points 2454, a contour point 2454-R and a contour point 2454-L present at both ends in the lateral direction. The face tracking module 2242 may detect, as the lower lip, a region 2557 surrounded by those contour points present at both ends and the inner contour points 2455 and the outer contour points 2454 present on a lower side in the up-down direction from the contour points present at both ends. The face tracking module 2242 may detect, as the upper lip, a region surrounded by the outer contour points 2454-R and 2454-L present at both ends and the inner contour points 2455 and the outer contour points 2454 present on an upper side in the up-down direction from the contour points present at both ends.

The method of detecting the mouth shape 2556 is not limited to the above-mentioned method, and the face tracking module 2242 may detect the mouth shape 2556 by another method. The face tracking module 2242 may detect the shapes of eyes, cheeks, and nose of the user 5 in a similar manner. More specifically, the face tracking module 2242 detects feature points representing the shape of the cheek of the user 5 based on image information generated by the first camera 150 and the cheek template 2237. The face tracking module 2242 detects feature points representing the shape of the nose of the user 5 based on the image information generated by the first camera 150 and the nose template 2238. The face tracking module 2242 detects feature points representing the shape of eyes of the user 5 based on image information generated by the second camera 160 and the eye template 2236.

In at least one aspect, the first camera 150 and the second camera 160 are capable of acquiring the depth information on the target object (face part) in the same manner as in the third camera 165. The face tracking module 2242 acquires, based on the depth information input from the first camera 150 and the second camera 160, position information on feature points (hereinafter also referred to as "face tracking points") representing the shape of the face part of the user 5 in the uvw visual-field coordinate system set in the HMD system 100. The face tracking points contain, for example, the inner contour points 2455 representing the shape of the mouth of the user 5. The computer 200' outputs the position information on face tracking points detected by the face tracking module 2242 as "face tracking data" to the other computer 200B based on one piece of image information generated by the first camera 150 and the second camera 160. The face tracking data can also be said to be data representing the facial expression of the face of the user. The data structure of the face tracking data may be formed by the position information on each face tracking point detected for each face part like the hand tracking data described later with reference to FIG. 29.

Figure 26B:
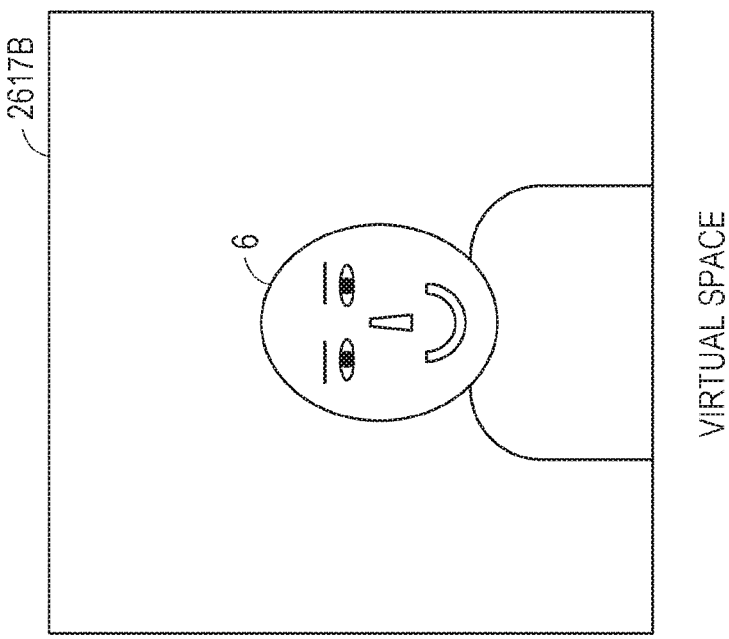
FIG. 26B A diagram of a facial expression of an avatar object of the user in a virtual space according to at least one embodiment of this disclosure.
Figure 26A:
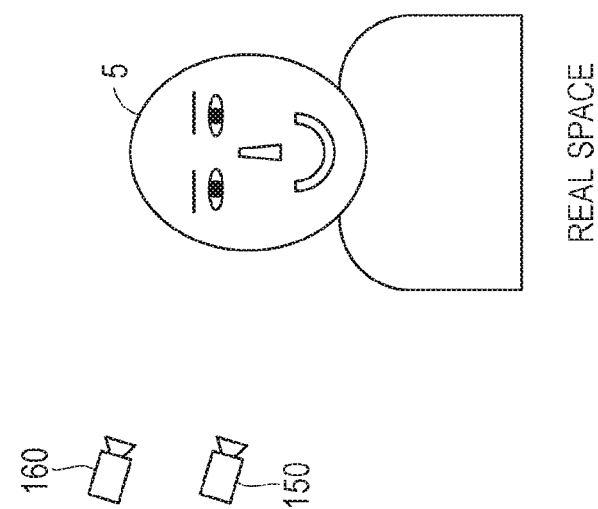
FIG. 26A A diagram of a facial expression of the user in a real space according to at least one embodiment of this disclosure.

FIG. 26A and FIG. 26B are diagrams of a comparison between a facial expression of the user 5 in the real space and a facial expression of the avatar object 6 of the user 5 in the virtual space according to at least one embodiment of this disclosure. FIG. 26A is a diagram of the user 5 in the real space. FIG. 26B is a diagram of a field-of-view image 2617B to be visually recognized by the user 5B.

Referring to FIG. 26A, the first camera 150B and the second camera 160 constructing the HMD system 100 photograph the user 5. The user 5 is smiling at the time of photography. In FIG. 26A, the user is wearing the HMD 120, but the HMD 120 is omitted for the sake of clarity.

The face tracking module 2242 generates face tracking data based on images generated by the first camera 150 and the second camera 160. The face tracking data contains position information on contour points representing the shape of the mouth of the user 5. The computer 200 outputs the generated face tracking data to the server 600. The server 600 transfers the data to the computer 200B communicating to/from the computer 200 by a chat application.

The processor 210B of the computer 200B serves as the virtual object generation module 1425B to translate the facial expression of the face of the user 5 in the avatar object 6 based on the received face tracking data. As an example, a plurality of movable points are set in the avatar object 6 so as to correspond to a plurality of face tracking points detected by the face tracking module 2242. The virtual object generation module 1425B updates the position of each of the plurality of movable points so as to follow the position of the received face tracking point (face tracking data). As a result, the user 5B is able to recognize the facial expression of the user 5 via the facial expression of the avatar object 6 in the virtual space 11B. In FIG. 26B, the user 5B recognizes the fact that the user 5 is smiling by visually recognizing the face of the avatar object 6 displayed in the view field image 2617B.

[Hand Tracking]

Figure 27A:
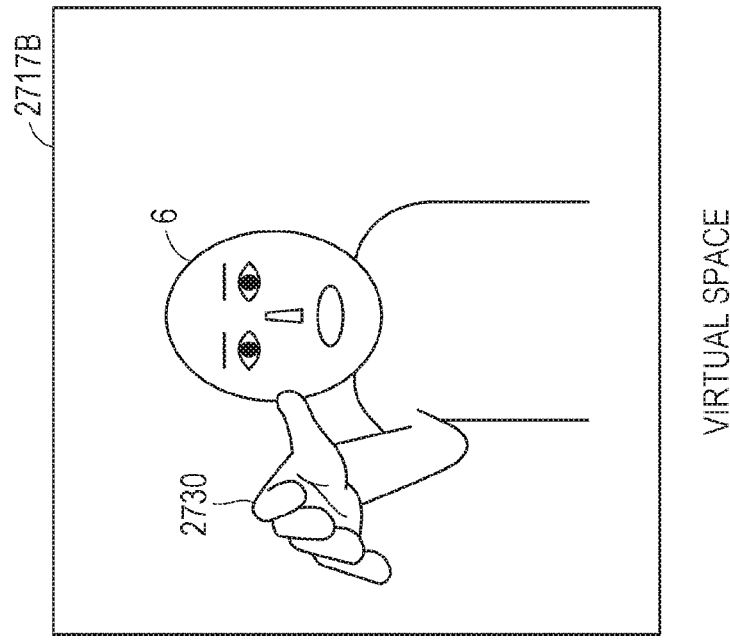
FIG. 27A A diagram of tracking the user in a real space according to at least one embodiment of this disclosure.
Figure 27B:
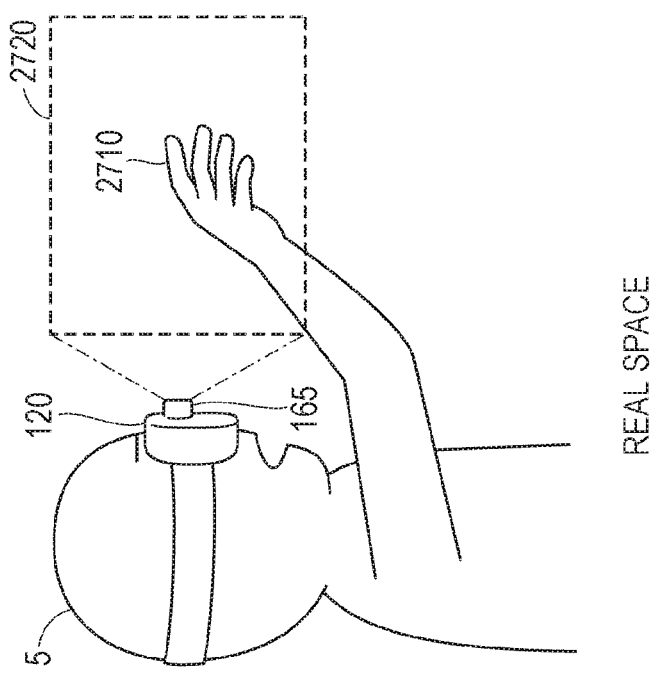
FIG. 27B A diagram of an avatar of a user in a virtual space according to at least one embodiment of this disclosure.

Next, with reference to FIG. 27A and FIG. 27B to FIG. 29, a description is given of processing of tracking a motion of the hand. FIG. 27A and FIG. 27B are diagrams of processing of tracking the hand of the user 5 according to at least one embodiment of this disclosure. FIG. 27A is a diagram of the user 5 in the real space. FIG. 27B is a diagram of the avatar object 6 contained in a field-of-view image 2717B of the user 5B.

Referring to FIG. 27A, the user 5 is wearing the HMD system 100 in the real space. The third camera 165 is mounted on the HMD system 100. The third camera 165 acquires depth information on objects contained in a space 2720 ahead of the HMD system 100. In FIG. 27A, the third camera 165 acquires depth information on a hand 2710 of the user 5 contained in the space 2720.

The hand tracking module 2243 acquires position information on the hand 2710 of the user 5 based on the depth information acquired by the third camera 165. The third camera 165 is mounted on the HMD 120, and thus the position information on the hand 2710 may indicate the position in the uvw visual-field coordinate system set in the HMD system 100'. The computer 200 transmits the position information to the computer 200B via the server 600 as hand tracking data.

In FIG. 27B, the processor 210B of the computer 200B serves as the virtual object generation module 1425B to cause a hand 2730 of the avatar object 6 arranged in the virtual space 11B to follow the position derived from the received hand tracking data. As an example, the processor 210B converts the position indicated by the received hand tracking data (position in uvw visual-field coordinate system set in HMD system 100) into a position in the XYZ coordinate system based on the position of the head of the avatar object 6. The processor 210B moves the hand 2730 of the avatar object 6 to the position after the conversion. In this manner, the motion of the hand 530 of the user 5 is translated in the avatar object 6 visually recognized by the user 5B.

Figures 28, 29:
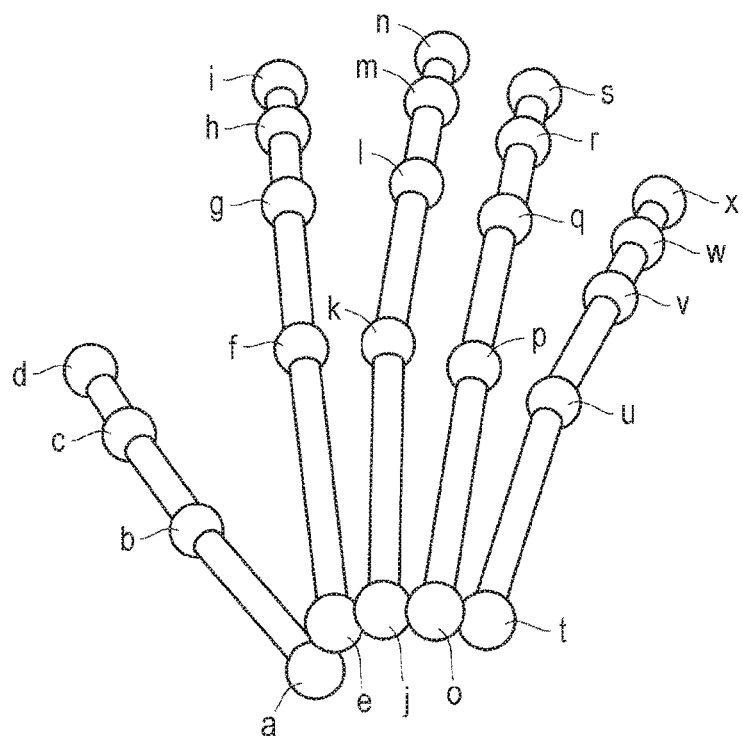
FIG. 28 A diagram of processing by a hand tracking module according to at least one embodiment of this disclosure.
FIG. 29 A table of an example of a data structure of hand tracking data according to at least one embodiment of this disclosure.

FIG. 28 is a diagram of processing of the hand tracking module 2243 according to at least one embodiment of this disclosure. The hand tracking module 2243 tracks motions of bones of the hand 2710 of the user 5 based on the hand depth information input from the third camera 165. In FIG. 28, the hand tracking module 2243 detects a position of each of joints a, b, c, x of the hand 2710 of the user 5.

The hand tracking module 2243 is capable of recognizing the shape (motions of fingers) of the hand 2710 of the user 5 based on the positional relationship among the joints a to x. In this sense, the joints a to x of the hand 2710 can be said to be feature points (hereinafter also referred to as "hand tracking points") representing the shape of the hand 2710. For example, the hand tracking module 2243 is able to recognize the fact that the hand 2710 of the user 5 points with a finger, that the hand 2710 is open, that the hand 2710 is closed, that the hand 2710 is pinching something, or that the hand 2710 is twisted. The hand tracking module 2243 is able to further determine whether or not the recognized hand is a left hand or a right hand based on the positional relationship among the joints a to d and other joints. Such third camera 165 and hand tracking module 2243 may be implemented, for example, by Leap Motion® provided by Leap Motion, Inc.

FIG. 29 is a table of the data structure of the hand tracking data according to at least one embodiment of this disclosure. In FIG. 29, the hand tracking data represents position information on each of the joints a to x of the hand 2710 in the uvw visual-field coordinate system set in the HMD 120. The hand tracking module 2243 generates hand tracking data representing the position information on hand tracking points based on the image information generated by the third camera 165.

The computer 200 transmits the acquired hand tracking data to the server 600. The server 600 transfers the data to the computer 200B, which communicates to/from the computer 200 by the chat application. The processor 210B of the computer 200B serves as the virtual object generation module 1425B to update the positions of joints forming the hand 2730 of the avatar object 6 arranged in the virtual space 11B based on the received hand tracking data. As a result, the user 5B is able to recognize the motion of the hand 2710 of the user 5 via the hand 2730 of the avatar object 6 in the virtual space 11B.

[Synchronization between Video and Sound]

FIG. 30A, FIG. 30B and FIG. 30C are examples of data structures to be transmitted/received between the computer 200 and the computer 200B according to at least one embodiment of this disclosure. FIG. 30A is an example of a data structure of face data according to at least one embodiment of this disclosure. FIG. 30B is an example of a data structure of eye data according to at least one embodiment of this disclosure. FIG. 30C is an example of a data structure of a sound packet according to at least one embodiment of this disclosure.

Referring to FIG. 30A, the face data contains a user ID, face tracking data, time information, and a data ID. The user ID identifies the source of face tracking data. The face tracking data represents the position information on face tracking points. The time information may be a time at which the corresponding face tracking data was generated by the face tracking module 2242. In at least one aspect, the time information is a time obtained by subtracting a delay time from the time when the face tracking data was generated by the face tracking module 2242. This delay time may contain a time required for the first camera 150 and the second camera 160 to generate image information and a time required for the face tracking module 2242 to generate face tracking data based on the image information. The time information that takes the delay time into consideration may accurately represent a time when the user 5 exhibited the facial expression corresponding to the face tracking data. This data ID identifies each of a plurality of pieces of face data. This data ID is used for synchronizing face tracking data and other data.

In at least one aspect, hand data containing hand tracking data is generated. This hand data has the same data structure as that of the face data. Specifically, the hand data contains a user ID, hand tracking data, time information, and a data ID. This time information may be a time at which the hand tracking data was generated by the hand tracking module 2243. In at least one aspect, the time information is a time obtained by subtracting a delay time from the time when the hand tracking data was generated by the hand tracking module 2243. This delay time may contain a time required for the third camera 165 to generate image information and a time required for the hand tracking module 2243 to generate hand tracking data based on image information.

Referring to FIG. 30B, the eye data contains a user ID, eye tracking data, time information, and a data ID. The user ID identifies the source of eye tracking data. The eye tracking data represents the center coordinate values (x coordinate value and y coordinate value) of the pupil of the user 5 detected by the line-of-sight detection module 1426. The time information may be a time at which the corresponding eye tracking data was generated by the line-of-sight detection module 1426. In at least one aspect, the time information is a time obtained by subtracting a delay time from the time when the eye tracking data was generated by the line-of-sight detection module 1426. This delay time may contain a time required for the line-of-sight detection module 1426 to perform processing of generating eye tracking data. The time information that takes the delay time into consideration may accurately represent the time when the user 5 performed a motion corresponding to the eye tracking data. The data ID identifies each of a plurality of pieces of eye data. This data ID is used for synchronizing eye tracking data and other data.

Referring to FIG. 30C, the sound packet contains a user ID, a sound signal, time information, and a data ID. The user ID identifies the source of the sound packet. The sound signal is digital data generated from an utterance of the user 5. The time information represents a time of an utterance corresponding to the sound signal. In at least one aspect, the time information represents a time at which the sound signal started to be acquired. In at least one aspect, the time information is a time obtained by subtracting a delay time from the time when the sound signal started to be acquired. This delay time may be a time required for converting the analog data acquired by the microphone 170 into digital data. The time information that takes the delay time into consideration may accurately represent a time at which the user 5 uttered sound corresponding to the sound signal. The data ID is identification information for synchronizing the sound signal and other data.

In at least one aspect, the processor 210 determines a data ID to be associated with various kinds of pieces of data described above based on the time information. Specifically, the processor 210 is configured to assign various kinds of pieces of data acquired substantially at the same time with the same data ID.

Figure 31:
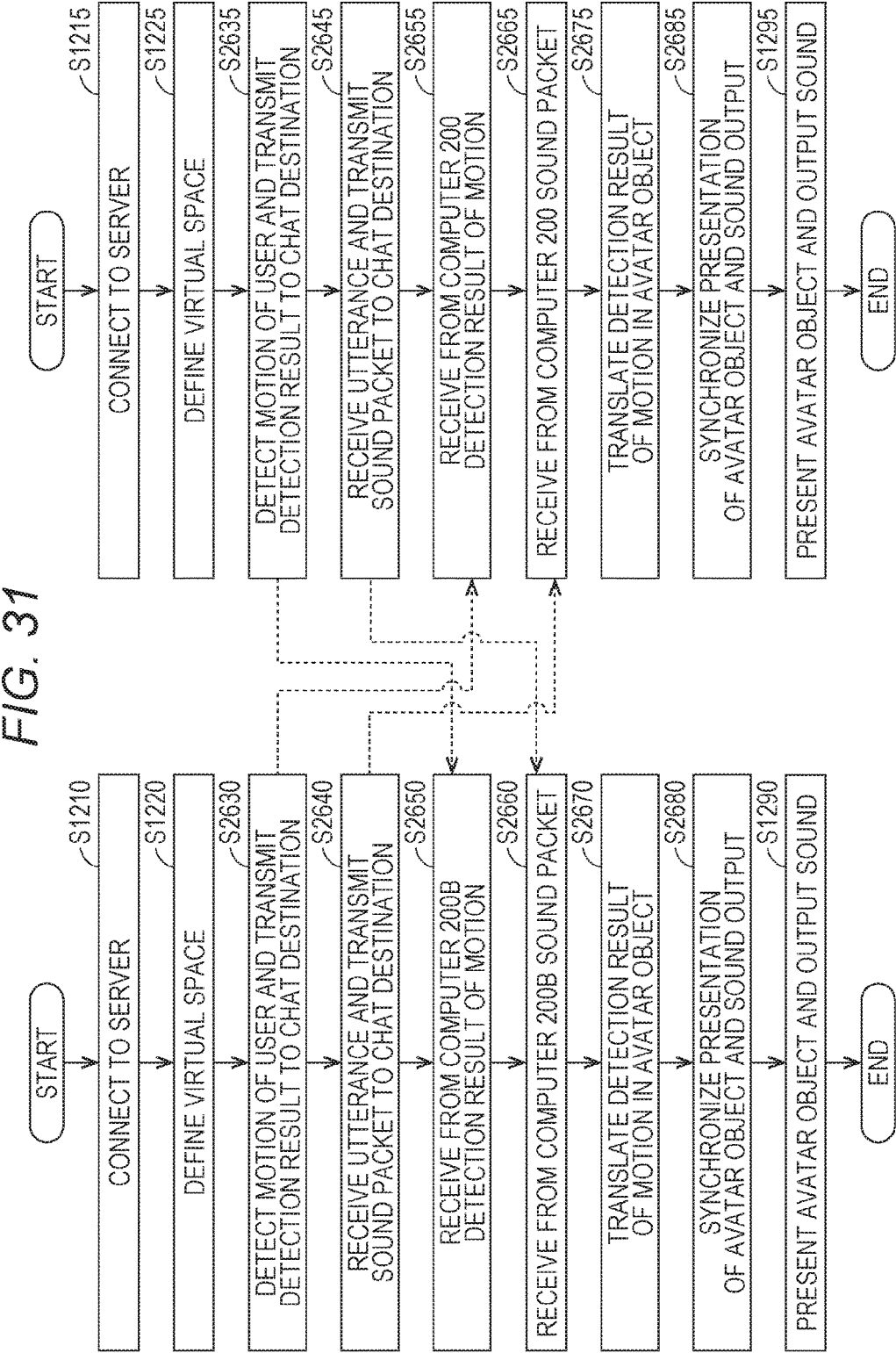
FIG. 31 A flowchart of processing for communication between a first computer and a second computer via a chat application according to at least one embodiment of this disclosure.

FIG. 31 is a flowchart of processing of the computer 200' and the computer 200B communicating to/from each other by a chat application according to at least one embodiment of this disclosure. In FIG. 31, similar processing as that of FIG. 17 is assigned with the same reference numeral of FIG. 17. Thus, a description of such processing is not repeated here.

In Step S2630, the processor 210 detects a motion of the user 5, and transmits a detection result to the computer 200B, which is the chat partner. The motion of the user 5 includes, for example, the movement of the line of sight of the user 5, the facial expression of the face, and the movement of the hand. The result of detecting the motion of the user 5 may include, for example, eye tracking data, face tracking data, and hand tracking data. In at least one aspect, the processor 210 transmits, to the computer 200B, eye data, face data, and hand data each including a user ID, time information, and a data ID. In Step S2635, the processor 210B detects a motion of the user 5B, and transmits a detection result to the chat partner, namely, the computer 200', in the same manner as in the processing of Step S2630.

In Step S2640, the processor 210 receives an utterance of the user 5 with the microphone 170, and transmits a sound signal that is based on the signal to the chat partner (computer 200B). In at least one aspect, the processor 210 transmits a sound packet containing a user ID, time information, and a data ID to the computer 200B. In Step S2645, the processor 210B receives an utterance of the user 5B with the microphone 170B, and transmits a sound packet to the chat partner (computer 200B) in the same manner as in the processing of Step S2640.

In Step S2650, the processor 210 receives the result of detecting the motion of the user 5B wearing the HMD system 100B from the computer 200B. In Step S2655, the processor 210B receives the result of detecting the motion of the user 5 wearing the HMD system 100' from the computer 200'.

In Step S2660, the processor 210 receives from the computer 200B the sound packet containing the sound signal that is based on the utterance of the user 5B. In Step S2665, the processor 210B receives from the computer 200' the sound packet containing the sound signal that is based on the utterance of the user 5.

In Step S2670, the processor 210 generates data in which the result (eye tracking data, face tracking data, and hand tracking data) of detecting the motion of the user 5B is translated in the avatar object 6B arranged in the virtual space 11. In Step S2675, the processor 210 generates data in which the result (eye tracking data, face tracking data, and hand tracking data) of detecting the motion of the user 5 is translated in the avatar object 6 arranged in the virtual space 11B.

In Step S2680, the processor 210 performs processing of synchronizing the timing of presenting the avatar object 6B to the HMD 120 and the timing of outputting the sound from the speaker 180. For example, in at least one aspect, when the computer 200' receives the result of detecting the motion of the user 5B from the computer 200B earlier than the sound packet, the processor 210 waits to output data on the avatar object generated in Step S2670 until reception of the sound packet. Upon receiving the sound packet, the processor 210 determines whether or not the user ID and time information of the sound packet are substantially the same as the user ID and time information of the motion detection result (eye data, face data, and hand data). As an example, the processor 210 determines that those pieces of time information are substantially the same when a time difference between those pieces of time information is within 10 msec. When the user ID and the time information are substantially the same, the processor 210 switches the processing to Step S1290. In Step S2685, the processor 210B performs processing of synchronizing the timing of presenting the avatar object 6 to the HMD 120B and the timing of outputting the sound from the speaker 180B in the same manner as in the processing of Step S2680.

In at least one aspect, the computer 200' receives the sound packet containing the sound signal of the user 5B from the computer 200B earlier than the result of detecting the motion of the user 5B. In this case, the processor 210 waits to output the sound signal until reception of the result of detecting the motion of the user 5B. The subsequent processing is similar to the above-mentioned processing, and thus a description of such processing is not repeated here.

In at least one aspect, the processor 210 executes the synchronization processing described above by using the user ID and the data ID. For example, in at least one aspect, the computer 200' receives the result of detecting the motion of the user 5B corresponding to a user ID "190B" and a data ID "001" earlier than a sound packet corresponding to the user ID "190B" and the data ID "001". In this case, the processor 210 waits to output data on the avatar object generated based on the detection result corresponding to the user ID "190B" and the data ID "001" until reception of the sound packet corresponding to the user ID "190B" and the data ID "001". When receiving the sound packet corresponding to the user ID "190B" and the data ID "001", the processor 210 outputs the data on the avatar object and the sound signal at the same timing. In the processing of Step S2680 and Step S2685, the receiving side performs the synchronization processing based on the time information, but the synchronization processing that is based on the data ID can be said to be performed by the transmitting side.

The HMD system 100' according to at least one embodiment thus synchronizes the timing at which the avatar object 6B corresponding to the user 5B is presented to the HMD system 100 and the timing at which the sound of the user 5B is output in communication (chat) to/from the HMD system 100B. As a result, the user 5 wearing the HMD 120 recognizes the motion of the avatar object 6B that is based on the motion of the user 5b, who is the chat partner, and the sound of the user 5B at the same time, and is thus able to continue chatting without feeling strange.

[Processing of Transmitting Data Representing Motion]

Next, a description is given of a method of transmitting data (e.g., eye tracking data, face tracking data, and hand tracking data) representing the motion of the user.

Different numbers of pieces of eye tracking data, face tracking data, and hand tracking data are generated per unit time. This is due to, for example, the fact that data acquisition intervals of the eye gaze sensor 140, the first camera 150, the second camera 160, and the third camera 165 are different from one another, and the fact that periods of time required for executing processing of generating various kinds of pieces of data described above are different from one another.

In at least one aspect, the computer 200B of the chat partner may update the facial expression, line of sight, and the hand at the same frames per second (FPS) based on the various kinds of pieces of data described above received from the computer 200'. In such a case, when all the various kinds of pieces of data generated by the computer 200' are transmitted to the computer 200B, data transmission may be inefficient.

When all the generated various kinds of pieces of data are transmitted to the chat partner, increase in processing load on the server 600 and drop in frames during a motion of the avatar object on the chat partner's side may occur due to increase in traffic. When drop in frames occurs during the motion of the avatar object, the user of the chat partner recognizes that the avatar object moves unnaturally, and cannot concentrate on the chat. In view of the above, a description is given of processing that may help to solve such a problem.

As an example, with reference to FIG. 32 to FIG. 34, a description is given of processing of transmitting the eye tracking data and the face tracking data to the chat partner.

FIG. 32 is a diagram of a data structure of a ring buffer 220-1 according to at least one embodiment of this disclosure. FIG. 33 is a diagram of a data structure of a ring buffer 220-2 according to at least one embodiment of this disclosure.

In at least one aspect, the processor 210 serves as the face tracking module 2242 to receive output signals from the first camera 150 and the second camera 160 every 12.5 msec (at 80 flame per sec (FPS)). Each time the face tracking module 2242 receives an output signal, the face tracking module 2242 generates face tracking data based on the received signal. As an example, the face tracking module 2242 generates face tracking data at 80 FPS.

In FIG. 32, the processor 210 stores the generated face tracking data into the ring buffer 220-1 of the memory 220. In the example of FIG. 32, the ring buffer 220-1 is capable of storing ten pieces of face tracking data. The greater number assigned after the symbol "F" of a piece of face tracking data F represents the fact that the piece of face tracking data F is a newer piece of data. The processor 210 is configured to update the oldest face tracking data with newly input face tracking data.

The processor 210 serves as the line-of-sight detection module 1426 to receive an output signal from the eye gaze sensor 140 every 8.3 msec (at 120 FPS). Each time the line-of-sight detection module 1426 receives an output signal, the line-of-sight detection module 1426 generates eye tracking data based on the received signal. As an example, the line-of-sight detection module 1426 generates eye tracking data at 120 FPS.

In FIG. 33, the processor 210 stores the generated eye tracking data into the ring buffer 220-2. In the example of FIG. 33, the ring buffer 220-2 is capable of storing ten pieces of face tracking data. The greater number assigned after the symbol "E" of a piece of face tracking data E represents the fact that the piece of face tracking data E is a newer piece of data. The processor 210 is configured to update the oldest eye tracking data with newly input eye tracking data.

(Processing of Generating Animation Data and Processing Based on Input Timing)

FIG. 34 is a diagram of processing of generating animation data according to at least one embodiment of this disclosure. The animation data is data containing two or more kinds of data (e.g., eye tracking data, face tracking data, and hand tracking data) representing a motion of the user. From another perspective, the animation data is data required for translating the motion of the user in the avatar object arranged in the virtual space. In FIG. 34, the animation data contains face tracking data and eye tracking data.

In at least one aspect, the processor 210 generates animation data at predetermined time intervals. The predetermined time interval is set to 16.7 msec (60 FPS) as one example. At a time T2900, the processor 210 generates animation data. More specifically, at the time T2900, the processor 210 associates face tracking data (F5 of FIG. 34), which is the latest among a plurality of pieces of face tracking data (F4 and F5 of FIG. 34) stored in the ring buffer 220-1, with eye tracking data (E8 of FIG. 34), which is the latest among a plurality of pieces of eye tracking data (E6 to E8 of FIG. 34) stored in the ring buffer 220-2, to thereby generate animation data.

At a time T2910 after a predetermined period of time from the time T2900, the processor 210 generates animation data again. In the example of FIG. 34, at the time T2910, the processor 210 associates the latest face tracking data (F7 of FIG. 34) and the latest eye tracking data (E10 of FIG. 34) with each other, to thereby generate animation data. The processor 210 transmits the generated animation data to the chat partner (e.g., computer 200B) via the server 600.

According to the configuration described above, the total number of pieces of eye tracking data and face tracking data forming each of the plurality of pieces of animation data to be transmitted to the chat partner via the server 600 is smaller than the total number of pieces of eye tracking data generated by the line-of-sight detection module 1426 and pieces of face tracking data generated by the face tracking module 2242. That is, the system. 100 according to at least one embodiment of this disclosure is able to suppress the amount of data to be transmitted to the chat partner via the server 600. With this, the traffic in the network 2 is reduced, and animation data is more easily transmitted to the chat partner. As a result, the avatar object that is displayed on the chat partner's side may move smoothly without a decrease in a number of frames associated with the movement.

The HMD system 100' in at least one aspect of this disclosure uses the ring buffers 220-1 and 220-2 to associate eye tracking data and face tracking data generated at substantially the same time with each other, to thereby generate animation data. As a result, the time at which the user 5 performs a motion corresponding to the eye tracking data and the time at which the user 5 performed a motion corresponding to the face tracking data are substantially the same. Therefore, the computer of the chat partner is able to synchronize eye tracking data and face tracking data (motion of avatar objects corresponding to those pieces of data) contained in the received animation data with each other simply by translating those pieces of data in the avatar object at the same timing.

In at least the above-mentioned example, the time interval (8.3 msec) at which the eye gaze sensor 140 outputs a signal to the computer 200 is shorter than the time interval (12.5 msec) at which the first camera 150 and the second camera 160 output a signal to the computer 200. In at least one aspect, the processor 210 generates such animation data that the total number of pieces of eye tracking data contained in the plurality of generated pieces of animation data is smaller than the total number of pieces of face tracking data generated by the face tracking module 2242.

In the above-mentioned example, the processor 210 generates animation data by associating one piece of eye tracking data with one piece of face tracking data, but the method of generating animation data is not limited thereto. For example, the processor 210 may generate such animation data that the eye tracking data and the face tracking data have a one-to-one correspondence (e.g., two pieces of data are contained for each of eye tracking data and face tracking data).

Further, in at least one aspect, the processor 210 generates such animation data that eye tracking data and face tracking data have a relationship other than the one-to-one correspondence. For example, the frequency at which the computer 200B of the chat partner updates a motion of the line of sight of the avatar object 6 arranged in the virtual space 11B may be twice the frequency of updating a motion of the facial expression. In this case, the processor 210 may generate animation data containing two pieces of eye tracking data and one piece of face tracking data.

(Processing of Generating Animation Data—Processing Based on Time Information)

Figure 35:
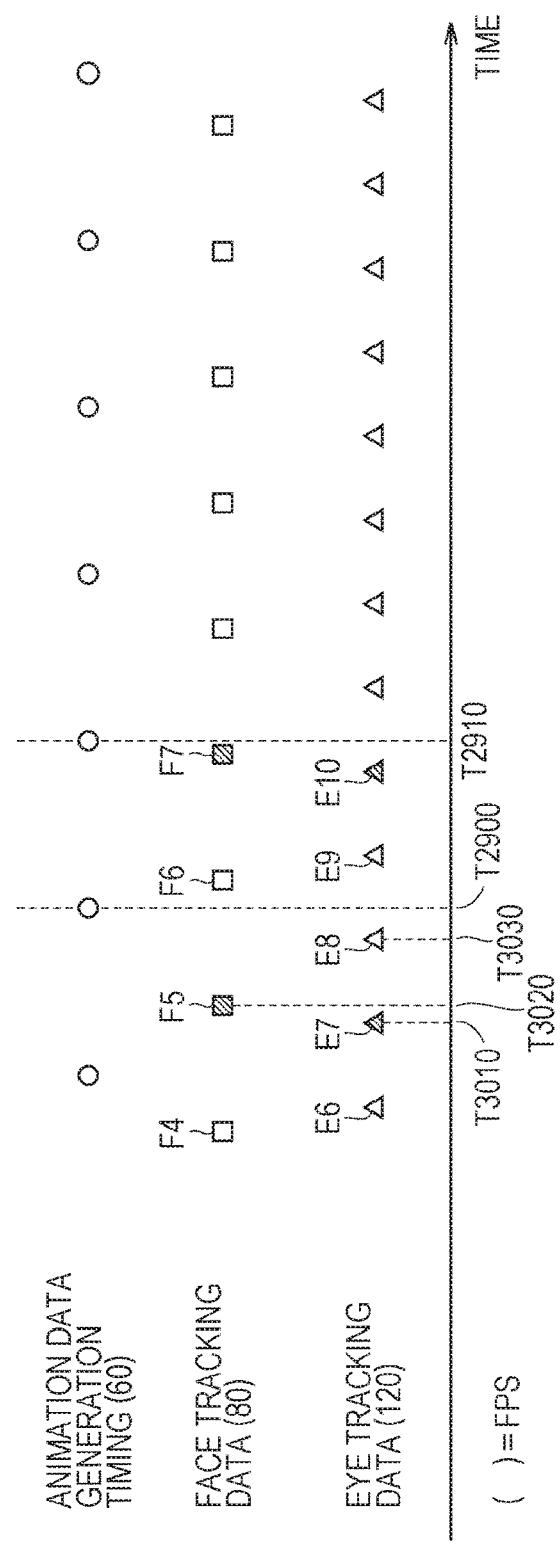
FIG. 35 A diagram of an example of processing of generating animation data according to at least one embodiment of this disclosure.

FIG. 35 is a diagram of processing of generating animation data in at least one aspect. In FIG. 34, the processor 210 is configured to generate animation data by associating the latest eye tracking data and face tracking data with each other. In FIG. 35, the processor 210 generates animation data based on time information associated with the eye tracking data and time information associated with the face tracking data.

The time information associated with the eye tracking data may be the time information described with reference to FIG. 30B. In this case, the computer 200' may acquire the time information from the internal real time clock (RTC). In at least one aspect, the time information associated with the eye tracking data is a time at which corresponding data was detected by the eye gaze sensor 140. In this case, the computer 200' may acquire the time information from the eye gaze sensor 140.

The time information associated with the face tracking data may be the time information described with reference to FIG. 30A. In this case, the computer 200' may acquire the time information from the internal RTC. In at least one aspect, the time information associated with the face tracking data is a time at which corresponding data was detected by the first camera 150 or the second camera 160. In this case, the computer 200' acquires the time information from the first camera 150 or the second camera 160.

Referring to FIG. 35, at a time T2900, which is a timing of generating animation data, the processor 210 generates animation data using two kinds of pieces of data that are the latest and acquired at times closest to each other among a plurality of pieces of eye tracking data and face tracking data stored in the ring buffers 220-1 and 220-2.

As an example, the processor 210 identifies the latest data (F5 in FIG. 35) for the face tracking data having a low FPS (number of pieces of data generated per unit time) among the eye tracking data and the face tracking data.

Next, the processor 210 identifies eye tracking data associated with a time that is closest to a time T3020 associated with the identified face tracking data F5. In the example of FIG. 35, the processor 210 identifies eye tracking data E7 with which a time T3010 is associated. The processor 210 generates animation data by associating the identified pieces of face tracking data and eye tracking data with each other.

According to the configuration described above, the HMD system 100 in at least one aspect is able to synchronize the face tracking data and the eye tracking data contained in animation data more accurately.

(Animation Packet)

In at least one aspect, the processor 210 is configured to transmit an animation packet containing a plurality of generated pieces of animation data at predetermined time intervals. In at least one embodiment, the animation packet is transmitted at an interval of 100 msec (10 FPS). The time interval for transmitting an animation packet is not required to be a fixed value, but may also be a variable value.

Figure 36:
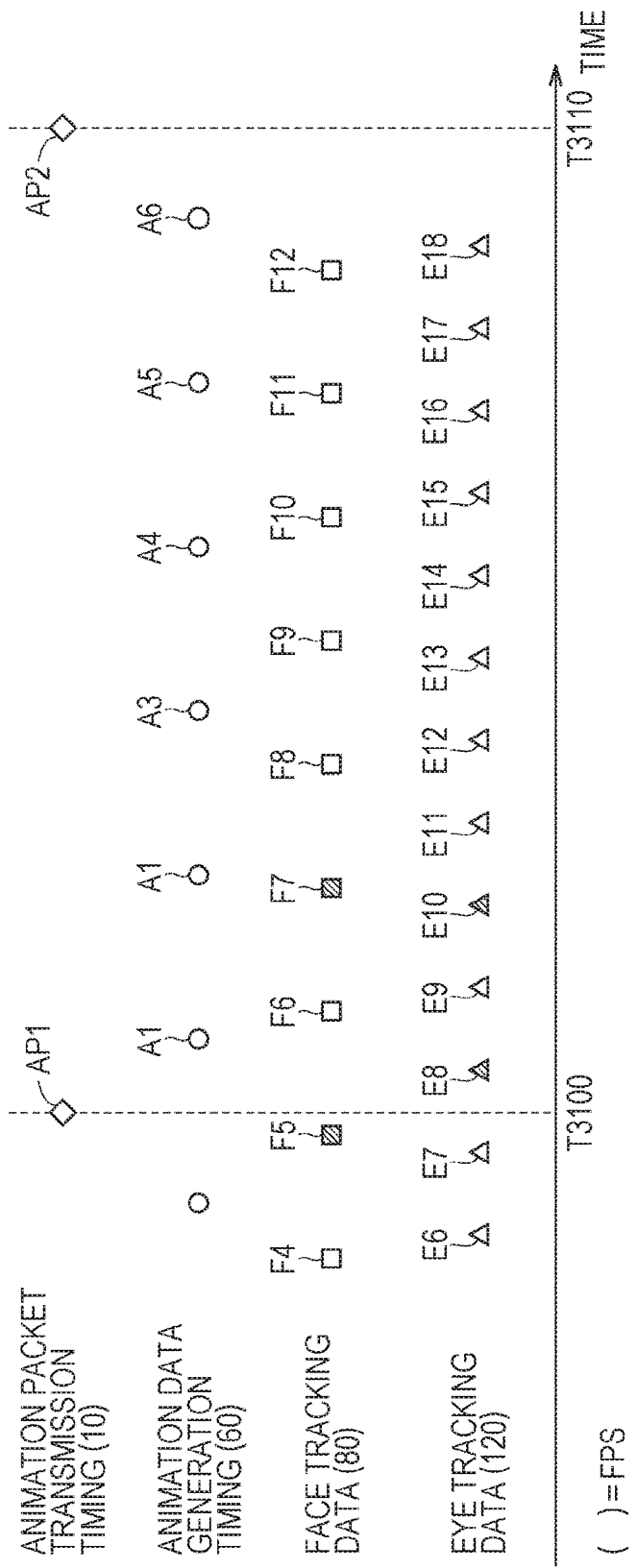
FIG. 36 A diagram of an example of processing of generating and transmitting animation packets according to at least one embodiment of this disclosure.

FIG. 36 is a diagram of processing of generating and transmitting animation packets according to at least one embodiment of this disclosure. Referring to FIG. 36, the processor 210 transmits an animation packet AP1 to the chat partner via the server 600 at a time T3100. The processor 210 transmits an animation packet AP2, which is the next animation packet, at a time T3110, which is after a predetermined period of time (e.g., 100 msec) from the time T3100.

The animation packet AP2 contains pieces of animation data A1 to A6 generated between the time T3100 and the time T3110. At this time, the animation data has been generated in the above-mentioned period, but eye tracking data and face tracking data forming the animation data have not necessarily been generated within the above-mentioned period. In FIG. 36, the face tracking data F5 forming the animation data A1 has been generated before the time T3100.

Figure 37:
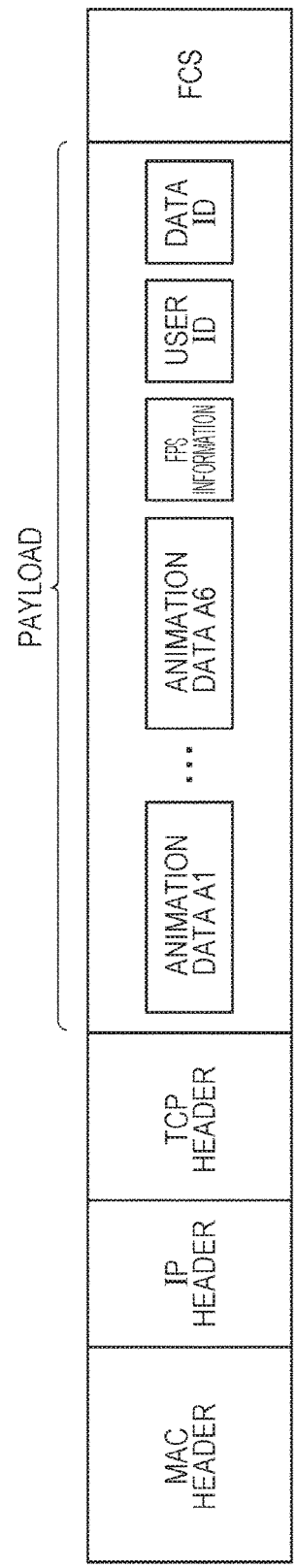
FIG. 37 A diagram of an example of a data structure of an animation packet according to at least one embodiment of this disclosure.

FIG. 37 is a diagram of a data structure of an animation packet according to at least one embodiment of this disclosure. The animation packet contains various kinds of header information such as a Media Access Control (MAC) header, an Internet Protocol (IP) header, and a Transmission Control Protocol (TCP) header, a payload, and a frame check sequence (FCS) for error correction.

The MAC header may contain information for identifying the computer (e.g., computer 200B) of the chat partner. The server 600 refers to the MAC header to transfer the animation packet to the computer of the chat partner.

The payload contains a plurality of pieces of animation data, FPS information, a user ID, and a data ID. The FPS information represents the number of pieces of animation data to be generated per unit time. The FPS information may be used for translating animation data in the computer of the chat partner. In the example of FIG. 36, the FPS information indicates "60". The user ID identifies a transmission source of an animation packet. The data ID distinguishes between a plurality of animation packets. The user ID and the data ID are used for processing of synchronizing a motion and sound of an avatar object described later.

When the transmission time interval of an animation packet is a fixed value, the animation packet is not required to contain the FPS information. In such a case, the processor 210 may transmit information indicating the fixed value to the computer of the chat partner at the start of a chat.

(Synchronization Between Video and Sound)

Next, a description is given of the processing of synchronizing video and sound executed when animation data containing data representing a plurality of types of motions of the user is transmitted or received.

Figure 38:
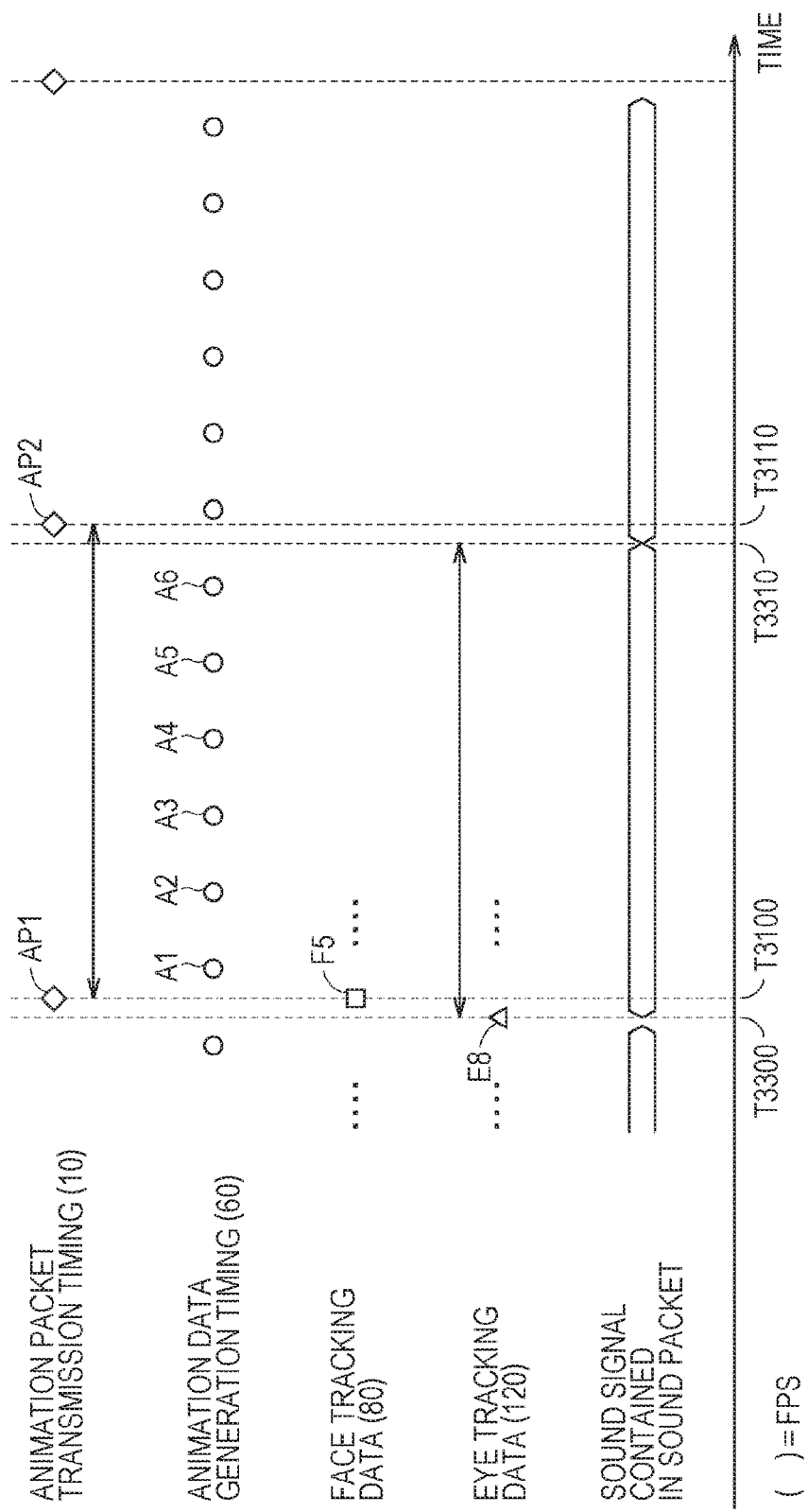
FIG. 38 A diagram of an example of synchronization processing between a motion of an avatar object and an output timing of a sound according to at least one embodiment of this disclosure.
Figure 39:
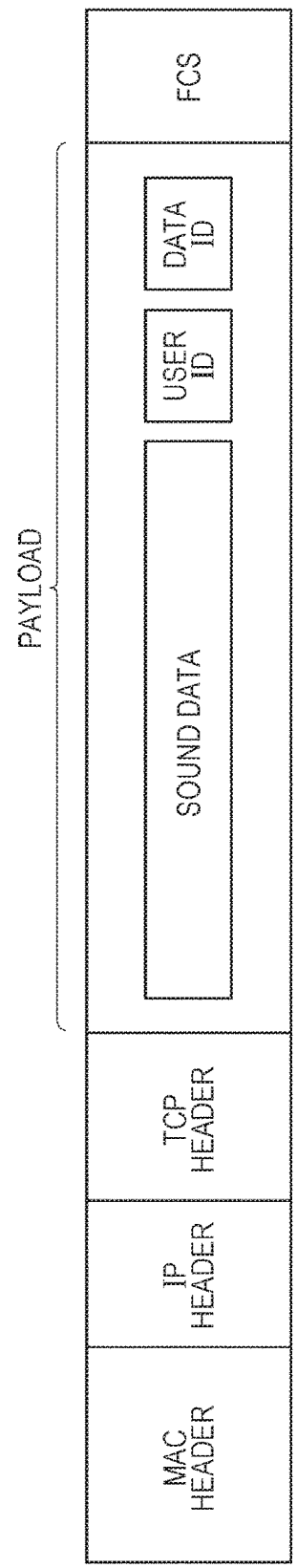
FIG. 39 A diagram of an example of a data structure of a sound packet according to at least one embodiment of this disclosure.

FIG. 38 is a diagram of processing of synchronizing a motion of an avatar object and a timing of outputting sound according to at least one embodiment of this disclosure. FIG. 39 is a diagram of an example of a data structure of a sound packet according to at least one embodiment of this disclosure.

Referring to FIG. 38, the processor 210 is configured to transmit, to the chat partner, a sound packet containing sound signals input from the microphone 170 over a predetermined period of time. In at least one aspect, the predetermined period of time is set to the same period as the transmission time interval of an animation packet.

More specifically, the processor 210 generates such a sound packet that the sound packet contains sound signals input over the predetermined period of time from a timing indicated by time information associated with a piece of animation data generated first among a plurality of pieces of animation data forming the animation packet. In at least one aspect, the time information associated with animation data may be time information (e.g., time information indicating earlier time) associated with any one of eye tracking data and face tracking data forming the animation data. In at least one aspect, the time information associated with animation data represents a time at which the animation data was generated.

In FIG. 38, the animation packet AP2 is formed of the plurality of pieces of animation data A1 to A6. The animation data A1 is generated first among the plurality of pieces of animation data A1 to A6. The processor 210 generates such a sound packet that the sound packet contains sound signals input over the predetermined period of time from a time T3300 indicated by time information associated with the animation data A1 generated first. In FIG. 38, the time T3300 indicated by the time information associated with the animation data A1 is time information associated with eye tracking data E8 indicating the earliest time among pieces of time information respectively associated with the face tracking data F5 and the eye tracking data E8 forming the animation data A1.

In FIG. 39, the sound packet in at least one aspect contains a user ID and a data ID. The user ID identifies a transmission source of the sound packet. The data ID distinguishes between a plurality of sound packets. The processor 210 sets the data ID contained in a sound packet and the data ID contained in an animation packet corresponding to the sound packet to a corresponding value. In at least one embodiment the data IDS for the animation packet and the sound packet have a same value. More specifically, the processor 210 sets the data ID of an animation packet and the data ID of a sound packet containing sound signals acquired with respect to time information associated with animation data contained in the animation packet to the same value. In FIG. 38, the processor 210 assigns the same data ID to the animation packet AP2 and the sound packet containing sound signals acquired over a period of time from the time T3300 to the time T3310.

The processor 210 transmits those animation packets and sound packets to the computer 200B of the chat partner via the server 600. The computer 200B sequentially translates a plurality of pieces of animation data (formed of eye tracking data and face tracking data) contained in the received animation packets in the avatar object 6 arranged in the virtual space 11B.

At this time, the computer 200B controls a timing of translating a plurality of pieces of animation data contained in an animation packet in the avatar object 6 based on the FPS information contained in the animation packet. For example, in at least one embodiment, the FPS information indicates "60" (FPS) and the refresh rate (number of times image is updated per unit time) of the monitor 130B of the HMD system 100B indicates "120". In such a case, the computer 200B translates animation data in the avatar object 6 once for every two frames. This is because translating animation data for each frame causes the user 5B to feel strange due to display of a motion of the avatar object 6 at double speed.

In at least one aspect, an animation packet contains information indicating the transmission time interval of an animation packet instead of the FPS information. This is because the FPS information can be derived from the number of pieces of animation data contained in the animation packet and the transmission time interval.

At a timing when the computer 200B translates animation data contained in the received animation packet in the avatar object 6, the computer 200B outputs, from the speaker 119B, sound signals contained in a sound packet assigned with the same user ID and data ID as those of the animation packet. With this, a motion of the avatar object 6 in the virtual space 11B and sound of the user 5 synchronized with the motion are presented to the user 5B. As a result, the user 5B is able to chat with the user 5 smoothly in the virtual space 11B.

In the example given above, the sound packet contains sound signals acquired over the transmission time interval of an animation packet. In another example, the sound packet may contain sound signals acquired over a period of an integral multiple of the transmission time interval. This is because a motion of the avatar object 6 in the virtual space 11B and sound of the user 5 synchronized with the motion are presented to the user 5B also with this configuration. In this case, an animation packet (data ID is null) not assigned with the data ID may be generated periodically.

(Control Structure)

Figure 40:
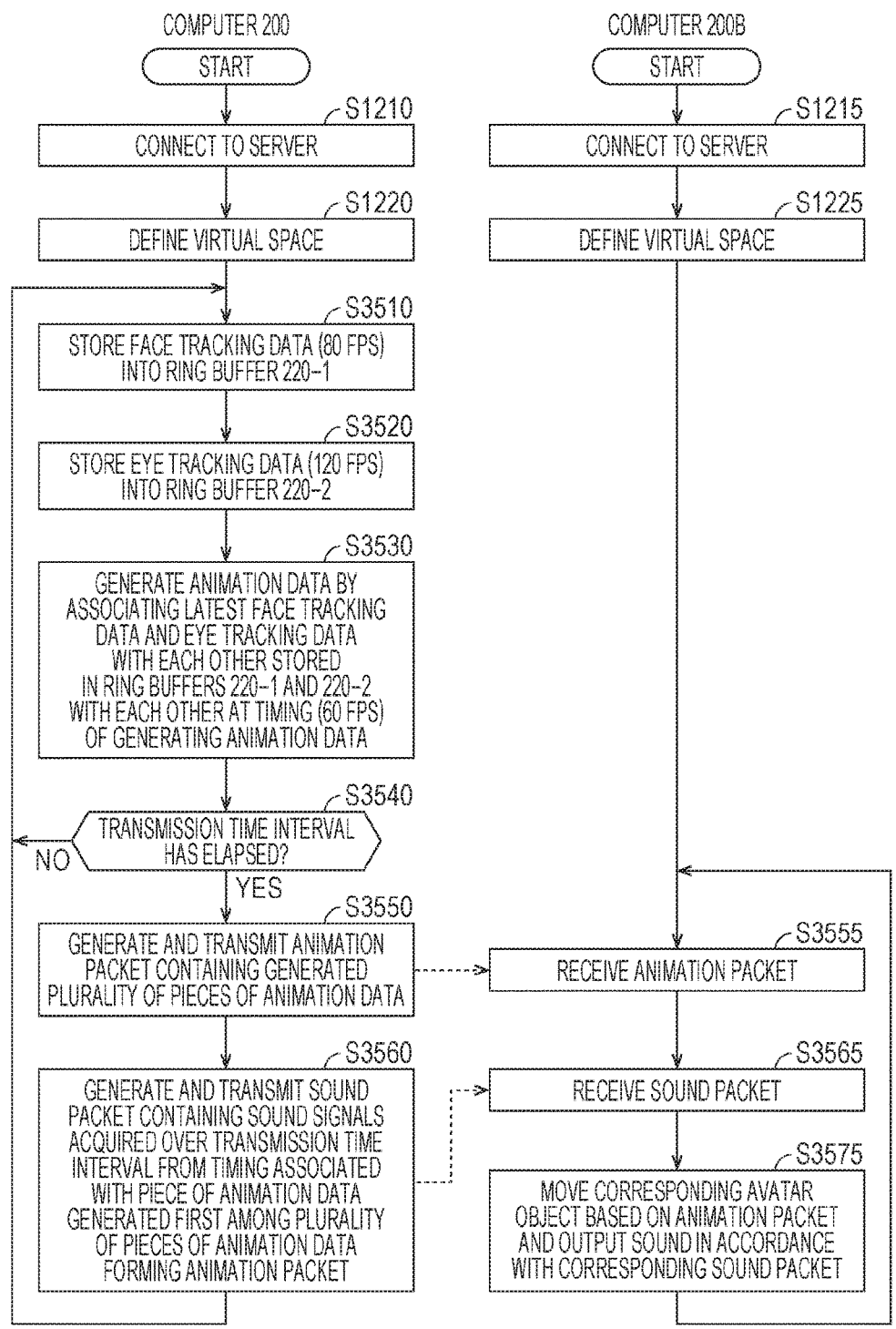
FIG. 40 A flowchart of an example of synchronization processing between a sound and a video using an animation packet and a sound according to at least one embodiment of this disclosure.

FIG. 40 is a flowchart of processing of synchronizing video and sound using animation packets and sound packets according to at least one embodiment of this disclosure. In FIG. 40, similar processing as that of FIG. 17 is assigned with the same reference symbol. Thus, a description of such processing is not repeated here.

In Step S3510, the processor 210 of the computer 200 serves as the face tracking module 2242 to receive output signals from the first camera 150 and the second camera 160 at predetermined time intervals (e.g., 12.5 msec), and generate face tracking data based on the received signals. The processor 210 stores the generated face tracking data into the ring buffer 220-1 as appropriate.

In Step S3520, the processor 210 serves as the line-of-sight detection module 1426 to receive output signals of the eye gaze sensor 140 at predetermined time intervals (e.g., 8.3 msec), and generate eye tracking data based on the received signals. The processor 210 stores the generated eye tracking data into the ring buffer 220-2 as appropriate.

In Step S3530, at a timing of generating animation data at predetermined intervals (e.g., 60 FPS), the processor 210 associates the latest face tracking data stored in the ring buffer 220-1 with the latest eye tracking data stored in the ring buffer 220-2 to generate animation data.

In Step S3540, the processor 210 determines whether or not the transmission time interval of an animation packet has elapsed. When the processor 210 determines that the transmission time interval has elapsed (YES in Step S3540), the processor 210 advances the processing to Step S3550. On the other hand, when the processor 210 determines that the transmission time interval has not elapsed (NO in Step S3540), the processor 210 returns the processing to Step S3510 to execute processing of generating animation data again.

In Step S3550, the processor 210 generates an animation packet containing a plurality of pieces of animation data generated within the transmission time interval, and transmits the animation packet to the computer 200B of the chat partner via the server 600.

In Step S3555, the processor 210B of the computer 200B receives the animation packet from the computer 200 via the server 600.

In Step S3560, the processor 210 generates a sound packet containing sound signals acquired over the transmission time interval from a timing indicated by time information associated with a piece of animation data generated first among a plurality of pieces of animation data forming the animation packet transmitted in Step S3550. The processor 210 transmits the generated sound packet to the computer 200B. After that, the processor 210 returns the processing to Step S3510.

In Step S3565, the processor 210B receives the sound packet from the computer 200.

In Step S3575, at a timing when the processor 210B translates animation data contained in the received animation packet in the avatar object 6 arranged in the virtual space 11B, the processor 210B outputs, from the speaker 180B, sound signals contained in the sound packet assigned with the same user ID and data ID as those of the animation packet. After that, the processor 210B returns the processing to Step S3555.

According the configuration described above, the HMD system 100B is able to synchronize a motion of the avatar object 6 arranged in the virtual space 11B and sound of the user 5 output from the speaker 180B. Thus, the user 5B is able to chat with the user 5 smoothly in the virtual space 11B.

Further, the computer 200' does not transmit all the generated pieces of eye tracking data and face tracking data to the computer 200B. Thus, the HMD system 100' is able to reduce the traffic in the network, the processing load on the server 600, and the processing load on the computer 200B of the chat partner.

(Control Structure in Consideration of Refresh Rate of Chat Partner)

FIG. 41 is a flowchart of processing of synchronizing video and sound in consideration of a refresh rate of the chat partner according to at least one embodiment of this disclosure. In FIG. 41, similar processing as that of FIG. 40 is assigned with the same reference symbol. Thus, a description of such processing is not repeated here.

In Step S3615, the processor 210B of the computer 200B transmits a refresh rate of the monitor 130B to the computer 200 of the chat partner. This refresh rate represents the number of times an image corresponding to the virtual space 11B is updated per unit time in the monitor 130B.

In Step S3620, the processor 210 of the computer 200 receives information indicating the refresh rate of the monitor 130B from the computer 200B.

In Step S3630, the processor 210 sets a time interval of generating animation data. More specifically, the processor 210 sets the time interval of generating animation data to be equal or smaller than the refresh rate of the monitor 130B. This is because, for example, when all the generated pieces of animation data are transmitted to the computer 200B on the assumption that animation data is generated at 60 FPS and the refresh rate of the monitor 130B is 30 FPS, half the pieces of animation data are not translated in the avatar object 6 and discarded.

According to the configuration described above, the HMD system 100 may further reduce the traffic in the network, the processing load on the server 600, and the processing load on the computer 200B of the chat partner.

The above-mentioned technical features disclosed in the above description as the aspects of at least one embodiment of this disclosure are summarized in the following manner, for example.

(Configuration 1)

According to at least one embodiment of this disclosure, there is provided a method to be executed by a computer 200 (or computer 200') in order to communicate via a virtual space 11. The method includes receiving at every first time interval an output signal from a first sensor (e.g., first camera 150, second camera 160, and third camera 165) and generating first data (e.g., face tracking data and hand tracking data) based on the received output signal (Step S3510). The method further includes receiving at every second time interval, which is shorter than the first time interval, an output signal from a second sensor (e.g., eye gaze sensor 140) different from the first sensor and generating second data (e.g., eye tracking data) based on the received output signal (Step S3520). The method further includes generating a plurality of pieces of animation data including the generated first data and the generated second data (Step S3530). The method further includes and transmitting the generated plurality of pieces of animation data to another computer 200B configured to communicate to/from the computer 200 (Step S3550). A total number of pieces of second data included in the plurality of animation data is smaller than a total number of a plurality of pieces of generated second data.

(Configuration 2)

According to at least one embodiment of this disclosure, the generating of the plurality of pieces of animation data (Step S3530) includes generating the plurality of pieces of animation data such that the first data and the second data are in a one-to-one correspondence.

(Configuration 3)

According to at least one embodiment of this disclosure, the method further includes acquiring first time information for each of a plurality of pieces of generated first data. The method further includes acquiring second time information for each of a plurality of pieces of generated second data. The generating of the plurality of pieces of animation data (Step S3530) includes generating the plurality of pieces of animation data by associating the plurality of pieces of generated first data and the plurality of pieces of generated second data with each other based on the first time information and the second time information (FIG. 35).

(Configuration 4)

According to at least one embodiment of this disclosure, the method further includes storing the generated first data and the generated second data into a memory 220 (Steps S3510 and 3520). The generating of the plurality of pieces of animation data (Step S3530) includes generating the plurality of pieces of animation data by associating, among pieces of first data and pieces of second data stored in the memory 220, a latest piece of first data and a latest piece of second data with each other.

(Configuration 5)

According to at least one embodiment of this disclosure, the method further includes receiving information representing a refresh rate (number of times (update count) image corresponding to virtual space is updated per unit time) of a monitor 130B of a head-mounted device 120B connected to the other computer 200B (Step S3620). The generating of the plurality of pieces of animation data (Step S3530) includes generating the plurality of pieces of animation data so that a number of pieces of animation data generated per unit time is equal to or smaller than the update count.

(Configuration 6)

According to at least one embodiment of this disclosure, the transmitting of the generated plurality of pieces of animation data (Step S3530) includes transmitting an animation packet containing a plurality of pieces of animation data to the other computer 200B at every predetermined time interval.

(Configuration 7)

According to at least one embodiment of this disclosure, the animation packet contains information on a number of pieces of animation data generated per unit time or information indicating a predetermined time interval.

(Configuration 8)

According to at least one embodiment of this disclosure, the method further includes acquiring a sound signal based on an utterance of a user 5. The method further includes transmitting a sound packet containing the sound signal acquired over a period of an integral multiple of a predetermined time interval to the other computer 200B (Step S3560).

(Configuration 9)

According to at least one embodiment of this disclosure, the sound packet contains the sound signal acquired over the period from a timing indicated by the time information associated with a piece of animation data generated earliest among the plurality of pieces of animation data contained in the animation packet.

(Configuration 10)

According to at least one embodiment of this disclosure, the animation packet contains identification information for identifying each of the plurality of animation packets. Each sound packet contains the identification information contained in the animation packet corresponding to the each sound packet.

(Configuration 11)

According to at least one embodiment of this disclosure, the method further includes providing the virtual space 11 to the user 5 of a head-mounted device 120 connected to the computer 200 (or by computer 200') by displaying a field-of-view image on a display 130 of the head-mounted device 120; detecting a motion of the head-mounted device 120 connected to the computer 200. The method further includes updating the field-of-view image in association with the detected motion.

(Configuration 12)

According to at least one embodiment of this disclosure, there is provided a program for executing any one of the methods described above on a computer 200.

(Configuration 13)

According to at least one embodiment of this disclosure, there is provided an information processing apparatus including a memory configured to store the program described above; and a processor coupled to the memory and configured to execute the program.

One of ordinary skill in the art would understand that the embodiments disclosed herein are merely examples in all aspects and in no way intended to limit this disclosure. The scope of this disclosure is defined by the appended claims and not by the above description, and that this disclosure encompasses all modifications made within the scope and spirit equivalent to those of the appended claims.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

What is claimed is:

1. A method to be executed by a first computer, the method comprising:
receiving at every first time interval a first signal output from a first sensor;
generating first data in accordance with the received first signal;
receiving at every second time interval, which is shorter than the first time interval, a second signal output from a second sensor;
generating second data in accordance with the received second signal;
generating a plurality of pieces of animation data based on the first data and the second data, wherein each of the plurality of pieces of animation data includes at least one piece of the first data and at least one piece of the second data; and
transmitting each of the plurality of pieces of animation data to a second computer configured to communicate with the first computer,
wherein a total number of pieces of second data included in the plurality of pieces of animation data is less than a total number of pieces of second data generated by the first computer.

2. The method according to claim 1, further comprising associating a predetermined piece of the first data with a predetermined piece of the second data,
wherein each of the plurality of pieces of animation data includes the predetermined piece of first data and the predetermined piece of second data.

3. The method according to claim 2, further comprising:
identifying first time information associated with the received first signal;
identifying second time information associated with the received second signal;
associating the first time information with the first data;
associating the second time information with the second data;
identifying a predetermined piece of the second time information corresponding to a predetermined piece of the first time information; and
associating the first data associated with the predetermined piece of the first time information with the second data associated with the predetermined piece of second time information.

4. The method according to claim 2, further comprising:
storing the first data into a memory of the first computer;
storing the second data into the memory of the first computer;
identifying a most recent piece of the first data and a most recent piece of the second data; and
associating the latest piece of the second data with the latest piece of the first data.

5. The method according to claim 1, further comprising identifying an update count by which the second computer is configured to update an image per unit time,
wherein the second computer is configured to generate the image based on the plurality of pieces of animation data, and
wherein a total number of pieces of animation data to be generated by the first computer per unit time is equal to or smaller than the update count.

6. The method according to claim 1, further comprising:
generating an animation packet containing at least some of the plurality of pieces of animation data; and
transmitting the animation packet to the second computer at every third time interval.

7. The method according to claim 6, further comprising associating, with the animation packet, information representing a total number of pieces of the animation data to be generated by the first computer per unit time or information representing the third time interval.

8. The method according to claim 6, further comprising:
acquiring at every fourth time interval a sound signal from a third sensor;
generating a sound packet containing the sound signal acquired over a period of an integer multiple of the third time interval; and
transmitting the sound packet to the second computer.

9. The method according to claim 8, further comprising:
identifying third time information associated with the sound signal;
identifying fourth time information associated with a piece of animation data of the plurality of pieces of animation data generated earliest among the plurality of pieces of animation data contained in the animation packet;
identifying, based on the third time information, the sound signal acquired over the period from a timing indicated by the fourth time information; and
generating the sound packet containing the identified sound signal.

10. The method according to claim 8,
wherein the animation packet contains first identification information for distinguishing each of the plurality of animation packets,
wherein the sound packet contains second identification information, and
wherein the sound packet is associated with at least one animation packet of the plurality of animation packets in accordance with a relationship between the first identification information and the second identification information.

11. The method according to claim 1, further comprising:
defining a virtual space, wherein the virtual space comprises an avatar associated with the second computer;
receiving a second plurality of pieces of animation data from the second computer;
controlling a first part of the avatar in accordance with first data included in the second plurality of pieces of animation data;
controlling a second part of the avatar in accordance with second data included in the second plurality of pieces of animation data;
detecting a motion of a head-mounted device (HMD) connected to the first computer;
identifying a field of view in the virtual space in accordance with the detected motion; and
generating a field-of-view image in accordance with the field of view,
wherein the first part comprises a direction of a head of the avatar or a facial expression of the avatar, and wherein the second part comprises a motion of an eyeball of the avatar.

12. A method to be executed by a first computer, the method comprising:
receiving at every first time interval a first signal output from a first sensor;
generating first data in accordance with the received first signal;
receiving at every second time interval, which is shorter than the first time interval, a second signal output from a second sensor;
generating second data in accordance with the received second signal;
associating a predetermined piece of the first data with a predetermined piece of the second data;
generating a plurality of pieces of animation data based on the first data and the second data, wherein each of the plurality of pieces of animation data includes the predetermined piece of first data and the predetermined piece of second data; and
transmitting each of the plurality of pieces of animation data to a second computer configured to communicate with the first computer,
wherein a total number of pieces of second data included in the plurality of pieces of animation data is less than a total number of pieces of second data generated by the first computer.

13. A method to be executed by a first computer, the method comprising:
receiving at every first time interval a first signal output from a first sensor;
generating first data in accordance with the received first signal;
receiving at every second time interval, which is shorter than the first time interval, a second signal output from a second sensor;
generating second data in accordance with the received second signal;
generating a plurality of pieces of animation data based on the first data and the second data;
acquiring at every fourth time interval a sound signal from a third sensor;
generating an animation packet containing at least some of the plurality of pieces of animation data;
transmitting the animation packet to a second computer at every third time interval, wherein the second computer is configured to communicate with the first computer,
generating a sound packet containing the sound signal acquired over a period of an integer multiple of the third time interval; and
transmitting the sound packet to the second computer,
wherein a total number of pieces of second data included in the plurality of pieces of animation data is less than a total number of pieces of second data generated by the first computer.

* * * * *